(12) United States Patent
Singh et al.

(10) Patent No.: US 12,040,943 B2
(45) Date of Patent: Jul. 16, 2024

(54) OPTIMIZATION OF NETWORK FUNCTION PROFILE ADMINISTRATION AND DISCOVERY

(71) Applicant: NOKIA TECHNOLOGIES OY, Espoo (FI)

(72) Inventors: Shubhranshu Singh, Seeheim (DE); Bruno Landais, Pleumeur Bodou (FR); Horst Thomas Belling, Erding (DE); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/040,622

(22) PCT Filed: Aug. 6, 2020

(86) PCT No.: PCT/EP2020/072103
§ 371 (c)(1),
(2) Date: Feb. 3, 2023

(87) PCT Pub. No.: WO2022/028699
PCT Pub. Date: Feb. 10, 2022

(65) Prior Publication Data
US 2023/0396498 A1  Dec. 7, 2023

(51) Int. Cl.
*H04L 41/0853* (2022.01)
*H04L 41/085* (2022.01)

(52) U.S. Cl.
CPC ........ *H04L 41/0853* (2013.01); *H04L 41/085* (2013.01)

(58) Field of Classification Search
CPC .................. H04L 41/085; H04L 41/0853
See application file for complete search history.

(56) References Cited

U.S. PATENT DOCUMENTS

| | | | |
|---|---|---|---|
| 7,024,548 B1 * | 4/2006 | O'Toole, Jr. | ........ H04L 41/0813 717/121 |
| 9,306,806 B1 * | 4/2016 | Zhang | ................. H04L 41/0895 |
| 2005/0004942 A1 * | 1/2005 | Madsen | ............. H04L 41/0853 |

* cited by examiner

*Primary Examiner* — Azizul Choudhury
(74) *Attorney, Agent, or Firm* — Barta Jones, PLLC

(57) ABSTRACT

There are provided measures for optimization of network function profile administration and discovery. Such measures exemplarily comprise, at a network entity in a network entity composition, transmitting, towards a network repository function, a network entity registration request including an identifier of said network entity, an identifier of said network entity composition, and network entity specific attributes of said network entity, and receiving a network entity registration response indicative of a result of said network entity registration request.

13 Claims, 41 Drawing Sheets

OPTIMIZATION OF NETWORK FUNCTION PROFILE ADMINISTRATION AND DISCOVERY

CROSS-REFERENCE TO RELATED APPLICATIONS

This application is a national phase entry of International Application No. PCT/EP2020/072103, filed Aug. 6, 2020, the contents of which are hereby incorporated by reference in their entirety.

FIELD

Various example embodiments relate to optimization of network function profile administration and discovery. More specifically, various example embodiments exemplarily relate to measures (including methods, apparatuses and computer program products) for realizing optimization of network function profile administration and discovery.

BACKGROUND

The present specification generally relates to central network entities (e.g. network repository functions (NRF)) providing repositories of e.g. functions and services of network functions (NF), network function entities (e.g. network functions (NF)) providing and announcing their e.g. functions and services and/or discovering and utilizing functions and services of other NFs, and control and/or management entities (e.g. operation, administration and maintenance (OAM)) controlling and/or managing e.g. central network entities and/or network function entities.

NRFs are central entities in the Third Generation Partnership Project (3GPP) 5G core network (5GC) for the discovery of NFs.

The 5G core architecture is defined as service-based and the interaction between NFs is represented in a service-based representation, where NFs within the control plane (CP) enables other authorized NFs to access their services. This representation also includes point-to-point reference points where necessary. NFs register profiles at the NRF containing for example an NF identifier, an NF type, interfaces of the NF described as an internet protocol (IP) address or a fully-qualified host name (FQDN), services offered by the NF, and slices information.

The NRF provides a discovery service providing information about the NFs registered at the NRF. The NF discovery service provides NF profiles containing the registered information, and other NFs can use the NRF discovery service for the discovery of NFs registered at the NRF and the selection of NFs to communicate with.

NFs within the 5GC Control Plane use service-based interfaces (SBI) for their interactions.

FIG. 30 shows a schematic diagram of an example of a system environment, and in particular illustrates a service based reference architecture of the 5G core.

The NFs are further defined and explained for example in 3GPP TS 23.501 and TS 23.502.

In order to support the service based approach in 5G core, NRF services are defined such as NF instance registration, NF profile update, NF status notification, and NF discovery. These NRF services are further defined and explained in 3GPP 5G specifications, including TS 23.501, TS 23.502, and TS 29.510.

In sum, in 5GC service based architecture (SBA), an NF service producer registers its NF profile in NRF, including NF level attributes, a list of NF service instances and associated attributes.

FIG. 31 shows a schematic diagram of signaling sequences, and in particular illustrates a registration procedure as outlined above (NF instance registration).

Further, the NF profile is used and returned by the NRF in an NF discovery procedure and NF status change subscribe/notify procedures.

FIG. 32 shows a schematic diagram of signaling sequences, and in particular illustrates a status change subscribe/notify procedure as outlined above (status change notification from NRF).

In 3GPP Release-16 (Rel-16), an enhanced Service Based Architecture (eSBA) may introduce concepts of NF sets and NF service sets, i.e. sets of functionally equivalent and inter-changeable NFs or NF services.

Accordingly, upon such occurrence, the NF profile may be extended with an NF set ID attribute, and the NF service profile may be extended with an NF service set ID attribute.

The ways according to which currently NF profiles are registered (with NRF), discovered, updated, and managed, and a status is respectively notified are not efficient. For example, the NFProfile as defined in table 6.2.6.2.3-1 in 3GPP TS 29.510-V-16.3.0 can be very large (e.g. it can already exceed 2 Million octets in Rel-15) and management thereof results in unnecessary signaling, storage and so on.

3GPP may define in Rel-16 the NF set and NF service set concepts. However, corresponding NRF procedures (e.g. on how NF profiles are registered (with NRF), discovered, updated, managed, and a status is respectively notified) have not been modified and do not leverage the full potential of these concepts.

In view thereof, known approaches entail the following disadvantages.

On the one hand, the size of each NF profile can be very large. For example, table 6.2.6.2.3-1 in 3GPP TS 29.510-V-16.3.0 provides a definition of NFProfile. This causes signaling overhead in the 5GC and may result in limiting the number of candidate producer profiles an NRF can return in a discovery response.

On the other hand, lots of attributes are common to all NFs of an NF set, or to all NF service instances of an NF service set.

Further, each NF (service) registers duplicate information to NRF.

Furthermore, the NF discovery response contains NF profiles with lots of duplicate information.

Finally, a change affecting one of the NF (service) set parameters results in as many NF profile registration updates towards the NRF and NF status changes notifications towards subscribing NFs as there are NF (services) in the NF (service) set.

The same disadvantages arise for NFs like unified data management (UDM), authentication server function (AUSF), unified data repository (UDR), policy control function (PCF) or charging function (CHF), which implement a Group ID, but may not implement the above-outlined set concept. Also for such NFs within a group, many attributes in their profiles will hold the same values and thus duplicate information.

Hence, the problem arises that the NF profile registration discovery, update, management, and related status notification and the related administration of NF profiles via OAM is to be enhanced and optimized in order to reduce network load and memory requirements and to make network function management and the related communication more efficient.

Hence, there is a need to provide for optimization of network function profile administration and discovery.

SUMMARY

Various example embodiments aim at addressing at least part of the above issues and/or problems and drawbacks.

Various aspects of example embodiments are set out in the appended claims.

According to an example aspect, there is provided a method of a network entity in a network entity composition, the method comprising transmitting, towards a network repository function, a network entity registration request including an identifier of said network entity, an identifier of said network entity composition, and network entity specific attributes of said network entity, and receiving a network entity registration response indicative of a result of said network entity registration request.

According to an example aspect, there is provided a method of a network repository function, the method comprising receiving, from a network entity in a network entity composition, a network entity registration request including an identifier of said network entity, an identifier of said network entity composition, and network entity specific attributes of said network entity, and transmitting, towards said network entity, a network entity registration response indicative of a result of said network entity registration request.

According to an example aspect, there is provided a method of a network entity, the method comprising transmitting, towards a network repository function, a network entity composition profile update request including an identifier of a network entity composition and information on an update of a profile for said network entity composition, and receiving a network entity composition profile update response indicative of a result of said network entity registration request.

According to an example aspect, there is provided a method of a network repository function, the method comprising receiving, from a network entity, a network entity composition profile update request including an identifier of a network entity composition and information on an update of a profile for said network entity composition, and transmitting, towards said network entity, a network entity composition profile update response indicative of a result of said network entity registration request.

According to an example aspect, there is provided a method of a network entity, the method comprising transmitting, towards a network repository function, a network entity subscription request, and receiving, from said network repository function, a network entity subscription response indicative of a result of said network entity subscription request.

According to an example aspect, there is provided a method of a network repository function, the method comprising receiving, from a network entity, a network entity subscription request, and transmitting, towards said network entity, a network entity subscription response indicative of a result of said network entity subscription request.

According to an example aspect, there is provided a method of a network entity, the method comprising transmitting, towards a network repository function, a network entity discovery request including at least one match parameter, and receiving a network entity discovery response indicative of at least one network service providing entity profile of a network service providing entity in a network entity composition, said at least one network service providing entity profile satisfying said at least one match parameter.

According to an example aspect, there is provided a method of a network entity, the method comprising receiving, from a network entity, a network entity discovery request including at least one match parameter, comparing registered network service providing entity profiles with said at least one match parameter, and transmitting, towards said network entity, a network entity discovery response indicative of at least one network service providing entity profile of a network service providing entity in a network entity composition, said at least one network service providing entity profile satisfying said at least one match parameter.

According to an example aspect, there is provided a method of a network entity, the method comprising transmitting, towards a network repository function, a network entity composition deregistration request including an identifier of a network entity composition to be deregistered, and receiving a network entity composition deregistration response indicative of a result of said network entity composition deregistration request.

According to an example aspect, there is provided a method of a network repository function entity, the method comprising receiving, from a network entity, a network entity deregistration request including an identifier of said network entity, and determining whether said network entity is a last member in a network entity composition.

According to an example aspect, there is provided a method of a network repository function entity, the method comprising receiving, from a network entity, a network entity composition deregistration request including an identifier of a network entity composition to be deregistered, deleting a profile for said network entity composition, and transmitting, towards said network entity, a network entity composition deregistration response indicative of a result of said network entity composition deregistration request.

According to an example aspect, there is provided an apparatus of a network entity in a network entity composition, the apparatus comprising transmitting circuitry configured to transmit, towards a network repository function, a network entity registration request including an identifier of said network entity, an identifier of said network entity composition, and network entity specific attributes of said network entity, and receiving circuitry configured to receive a network entity registration response indicative of a result of said network entity registration request.

According to an example aspect, there is provided an apparatus of a network repository function, the apparatus comprising receiving circuitry configured to receive, from a network entity in a network entity composition, a network entity registration request including an identifier of said network entity, an identifier of said network entity composition, and network entity specific attributes of said network entity, and transmitting circuitry configured to transmit, towards said network entity, a network entity registration response indicative of a result of said network entity registration request.

According to an example aspect, there is provided an apparatus of a network entity, the apparatus comprising transmitting circuitry configured to transmit, towards a network repository function, a network entity composition profile update request including an identifier of a network entity composition and information on an update of a profile for said network entity composition, and receiving circuitry configured to receive a network entity composition profile update response indicative of a result of said network entity registration request.

According to an example aspect, there is provided an apparatus of a network repository function, the apparatus comprising receiving circuitry configured to receive, from a network entity, a network entity composition profile update request including an identifier of a network entity composition and information on an update of a profile for said network entity composition, and transmitting circuitry configured to transmit, towards said network entity, a network entity composition profile update response indicative of a result of said network entity registration request.

According to an example aspect, there is provided an apparatus of a network entity, the apparatus comprising transmitting circuitry configured to transmit, towards a network repository function, a network entity subscription request, and receiving circuitry configured to receive, from said network repository function, a network entity subscription response indicative of a result of said network entity subscription request.

According to an example aspect, there is provided an apparatus of a network repository function, the apparatus comprising receiving circuitry configured to receive, from a network entity, a network entity subscription request, and transmitting circuitry configured to transmit, towards said network entity, a network entity subscription response indicative of a result of said network entity subscription request.

According to an example aspect, there is provided an apparatus of a network entity, the apparatus comprising transmitting circuitry configured to transmit, towards a network repository function, a network entity discovery request including at least one match parameter, and receiving circuitry configured to receive a network entity discovery response indicative of at least one network service providing entity profile of a network service providing entity in a network entity composition, said at least one network service providing entity profile satisfying said at least one match parameter.

According to an example aspect, there is provided an apparatus of a network entity, the apparatus comprising receiving circuitry configured to receive, from a network entity, a network entity discovery request including at least one match parameter, comparing circuitry configured to compare registered network service providing entity profiles with said at least one match parameter, and transmitting circuitry configured to transmit, towards said network entity, a network entity discovery response indicative of at least one network service providing entity profile of a network service providing entity in a network entity composition, said at least one network service providing entity profile satisfying said at least one match parameter.

According to an example aspect, there is provided an apparatus of a network entity, the apparatus comprising transmitting circuitry configured to transmit, towards a network repository function, a network entity composition deregistration request including an identifier of a network entity composition to be deregistered, and receiving circuitry configured to receive a network entity composition deregistration response indicative of a result of said network entity composition deregistration request.

According to an example aspect, there is provided an apparatus of a network repository function entity, the apparatus comprising receiving circuitry configured to receive, from a network entity, a network entity deregistration request including an identifier of said network entity, and determining circuitry configured to determine whether said network entity is a last member in a network entity composition.

According to an example aspect, there is provided an apparatus of a network repository function entity, the apparatus comprising receiving circuitry configured to receive, from a network entity, a network entity composition deregistration request including an identifier of a network entity composition to be deregistered, deleting circuitry configured to delete a profile for said network entity composition, and transmitting circuitry configured to transmit, towards said network entity, a network entity composition deregistration response indicative of a result of said network entity composition deregistration request.

According to an example aspect, there is provided an apparatus of a network entity in a network entity composition, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function, a network entity registration request including an identifier of said network entity, an identifier of said network entity composition, and network entity specific attributes of said network entity, and receiving a network entity registration response indicative of a result of said network entity registration request.

According to an example aspect, there is provided an apparatus of a network repository function, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity in a network entity composition, a network entity registration request including an identifier of said network entity, an identifier of said network entity composition, and network entity specific attributes of said network entity, and transmitting, towards said network entity, a network entity registration response indicative of a result of said network entity registration request.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function, a network entity composition profile update request including an identifier of a network entity composition and information on an update of a profile for said network entity composition, and receiving a network entity composition profile update response indicative of a result of said network entity registration request.

According to an example aspect, there is provided an apparatus of a network repository function, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity, a network entity composition profile update request including an identifier of a network entity composition and information on an update of a profile for said network entity composition, and transmitting, towards said network entity, a network entity composition profile update response indicative of a result of said network entity registration request.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function, a network entity subscription request, and receiving, from said network repository function, a network entity subscription response indicative of a result of said network entity subscription request.

According to an example aspect, there is provided an apparatus of a network repository function, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity, a network entity subscription request, and transmitting, towards said network entity, a network entity subscription response indicative of a result of said network entity subscription request.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function, a network entity discovery request including at least one match parameter, and receiving a network entity discovery response indicative of at least one network service providing entity profile of a network service providing entity in a network entity composition, said at least one network service providing entity profile satisfying said at least one match parameter.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity, a network entity discovery request including at least one match parameter, comparing registered network service providing entity profiles with said at least one match parameter, and transmitting, towards said network entity, a network entity discovery response indicative of at least one network service providing entity profile of a network service providing entity in a network entity composition, said at least one network service providing entity profile satisfying said at least one match parameter.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function, a network entity composition deregistration request including an identifier of a network entity composition to be deregistered, and receiving a network entity composition deregistration response indicative of a result of said network entity composition deregistration request.

According to an example aspect, there is provided an apparatus of a network repository function entity, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity, a network entity deregistration request including an identifier of said network entity, and determining whether said network entity is a last member in a network entity composition.

According to an example aspect, there is provided an apparatus of a network repository function entity, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity, a network entity composition deregistration request including an identifier of a network entity composition to be deregistered, deleting a profile for said network entity composition, and transmitting, towards said network entity, a network entity composition deregistration response indicative of a result of said network entity composition deregistration request.

According to an example aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient provision/storage and exchange of network function profile information to thereby solve at least part of the problems and drawbacks identified in relation to the prior art.

By way of example embodiments, there is provided optimization of network function profile administration and discovery. More specifically, by way of example embodiments, there are provided measures and mechanisms for realizing optimization of network function profile administration and discovery.

Thus, improvement is achieved by methods, apparatuses and computer program products enabling/realizing optimization of network function profile administration and discovery.

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
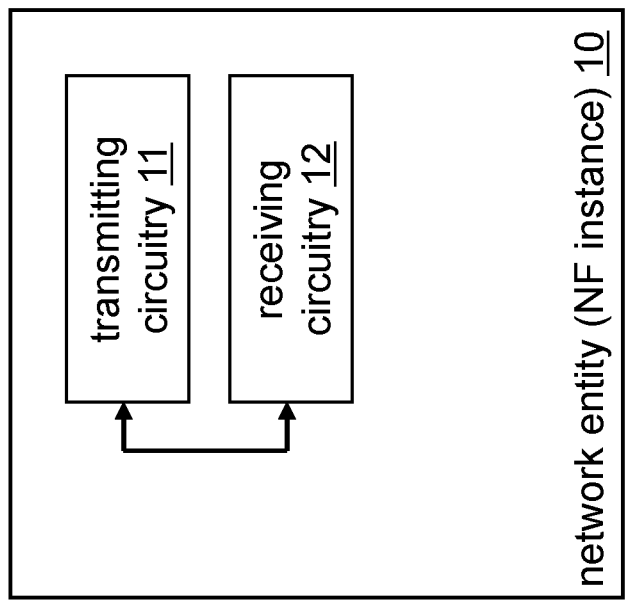
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

In particular, the present disclosure and its embodiments may be applicable in any network compound in which profile information is registered and announced/provided e.g. for the selection of network entities or network function entities suitable for an intended purpose.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) optimization of network function profile administration and discovery.

According to example embodiments, generally, when an NF service consumer uses the discovery service to discover NF profiles or NF service profiles, and several of these profiles are within an NF set or NF service set, the service producer of the discovery service (e.g. NRF) provides information about the NF set or NF service set, and NF profiles and/or NF service profiles excluding attributes with shared values among the NF set or NF service set.

Hence, according to example embodiments, new concepts of NF set and/or NF service set profiles are defined. Further, according to example embodiments, the NFManagement API is extended to define new resources enabling to register and discover new NF (service) set profiles.

Additionally, according to example embodiments, efficient approaches are provided with respect to the way how the NF set and NF service set profiles are registered (with NRF), discovered, updated, status notified and managed.

Hence, according to example embodiments, multiple registrations of the same NF set profile by different NF instances are avoided.

Further, according to example embodiments, an enhanced NF discovery procedure to discover NF service producers supporting NF sets is provided. This includes specific requirements to support backward compatibility with NF service consumers not supporting NF set profiles.

Further, according to example embodiments, an enhanced NF profile update procedure to NRF and an enhanced notification procedure to NF service consumers supporting NF set profiles are provided. This includes specific requirements to support backward compatibility with NF service consumers not supporting NF set profiles.

Finally, according to example embodiments, an NF instance deregistration of an earlier registered NF instance within an NF set is provided.

While example embodiments are described in relation to NF sets or NF service sets, these are also applicable for NFs organized in groups. As such, sets and groups are commonly referred to as compositions.

Example embodiments apply to the 5GC but are not limited thereto. Contrary, example embodiments can also apply to any network requiring the need to register or discover network functions of an NF set (e.g. access network defined with SBIs).

In the following, example embodiments are explained in general terms.

Figure 19:
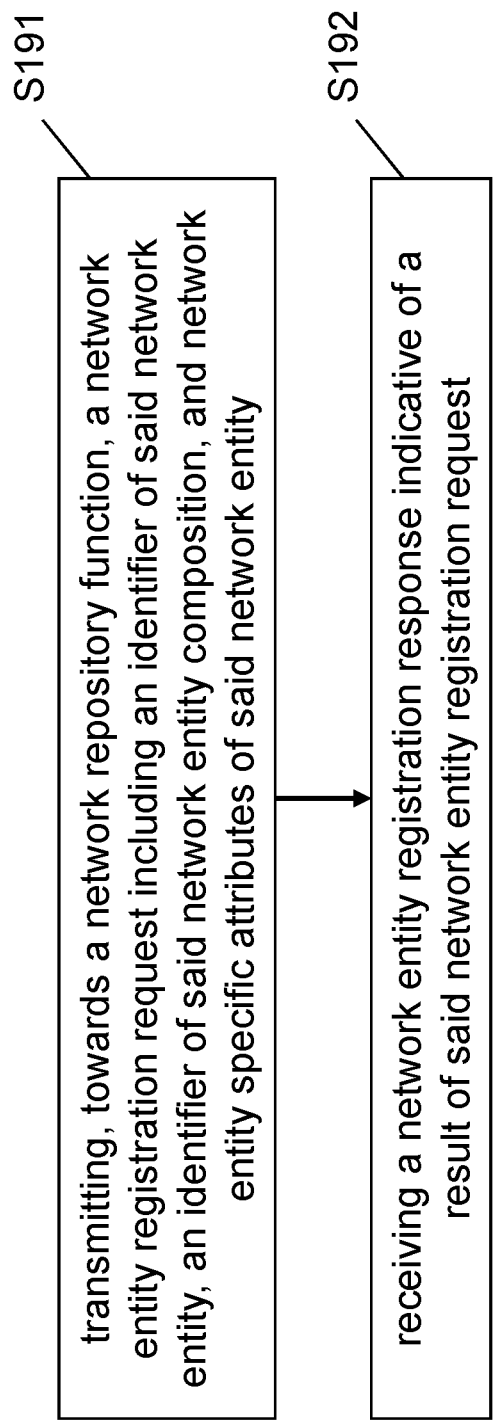
FIG. 19 is a schematic diagram of a procedure according to example embodiments.

FIG. 1 is a block diagram illustrating an apparatus according to example embodiments. The apparatus may be a network entity 10 such as a network function (NF) (entity) (in a network entity composition) comprising a transmitting circuitry 11 and a receiving circuitry 12. The transmitting circuitry 11 transmits, towards a network repository function, a network entity registration request including an identifier of said network entity, an identifier of said network entity composition, and network entity specific attributes of said network entity. The receiving circuitry 12 receives a network entity registration response indicative of a result of said network entity registration request. FIG. 19 is a schematic diagram of a procedure according to example embodiments. The apparatus according to FIG. 1 may perform the method of FIG. 19 but is not limited to this method. The method of FIG. 19 may be performed by the apparatus of FIG. 1 but is not limited to being performed by this apparatus.

As shown in FIG. 19, a procedure according to example embodiments comprises an operation of transmitting (S191), towards a network repository function, a network entity registration request including an identifier of said network entity, an identifier of said network entity composition, and network entity specific attributes of said network entity, and an operation of receiving (S192) a network entity registration response indicative of a result of said network entity registration request.

Figure 2:
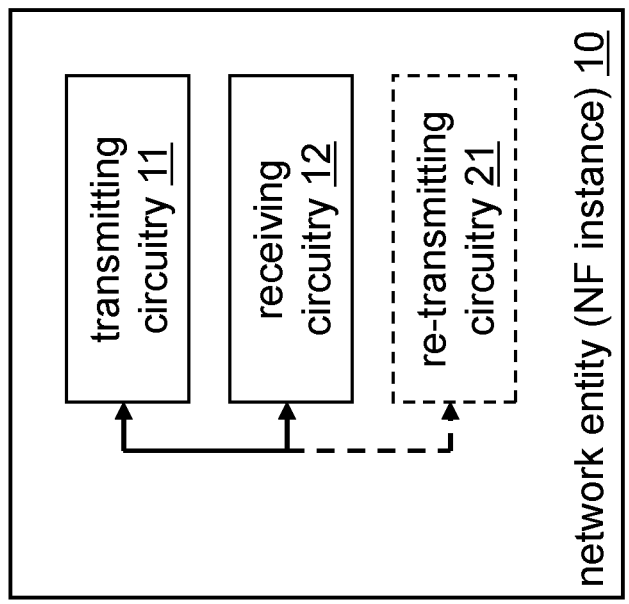
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a re-transmitting circuitry 21.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to further example embodiments, said network entity registration request does not include attributes common to network entities of said network entity composition.

According to further example embodiments, said network entity registration response indicates that a profile for said network entity is created.

According to further example embodiments, said network entity registration response includes said profile created for said network entity.

According to a variation of the procedure shown in FIG. 19, exemplary additional operations are given, which are inherently independent from each other as such. According to such variation, said network entity registration response indicates that a profile for said network entity composition is missing, and an exemplary method according to example embodiments may comprise an operation of transmitting, towards said network repository function, a composition profile registration request including said identifier of said network entity composition and said profile for said network entity composition.

According to a variation of the procedure shown in FIG. 19, exemplary additional operations are given, which are inherently independent from each other as such. According to such variation, an exemplary method according to example embodiments may comprise an operation of transmitting, towards said network repository function, a composition profile registration request including said identifier of said network entity composition and said profile for said network entity composition.

According to a variation of the procedure shown in FIG. 19, exemplary additional operations are given, which are inherently independent from each other as such. According to such variation, an exemplary method according to example embodiments may comprise an operation of receiving a composition profile registration response indicating that said profile for said network entity composition is created, wherein said composition profile registration response includes said profile created for said network entity composition.

According to a variation of the procedure shown in FIG. 19, exemplary additional operations are given, which are inherently independent from each other as such. According to such variation, an exemplary method according to example embodiments may comprise an operation of re-transmitting, towards said network repository function, said network entity registration request including said identifier of said network entity, said identifier of said network entity composition, and said network entity specific attributes of said network entity.

Alternatively, according to further example embodiments, said network entity composition is a network function set, said network entity is a network function instance, said profile for said network entity is a network function profile, and said profile for said network entity composition is a network function set profile.

Alternatively, according to further example embodiments, said network entity composition is a network function service set, said network entity is a network function instance, said profile for said network entity is a network function service profile, and said profile for said network entity composition is a network function service set profile.

Alternatively, according to further example embodiments, said network entity composition is a network function group, said network entity is a network function instance, said profile for said network entity is a network function profile, and said profile for said network entity composition is a network function group profile.

Figure 3:
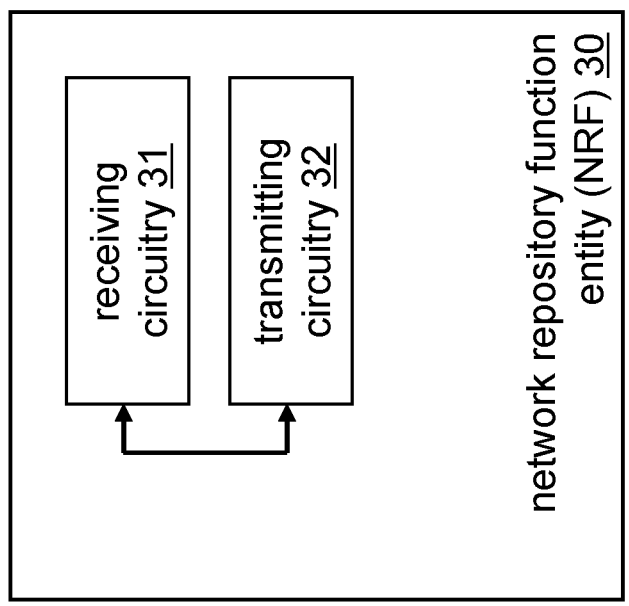
FIG. 3 is a block diagram illustrating an apparatus according to example embodiments.
Figure 20:
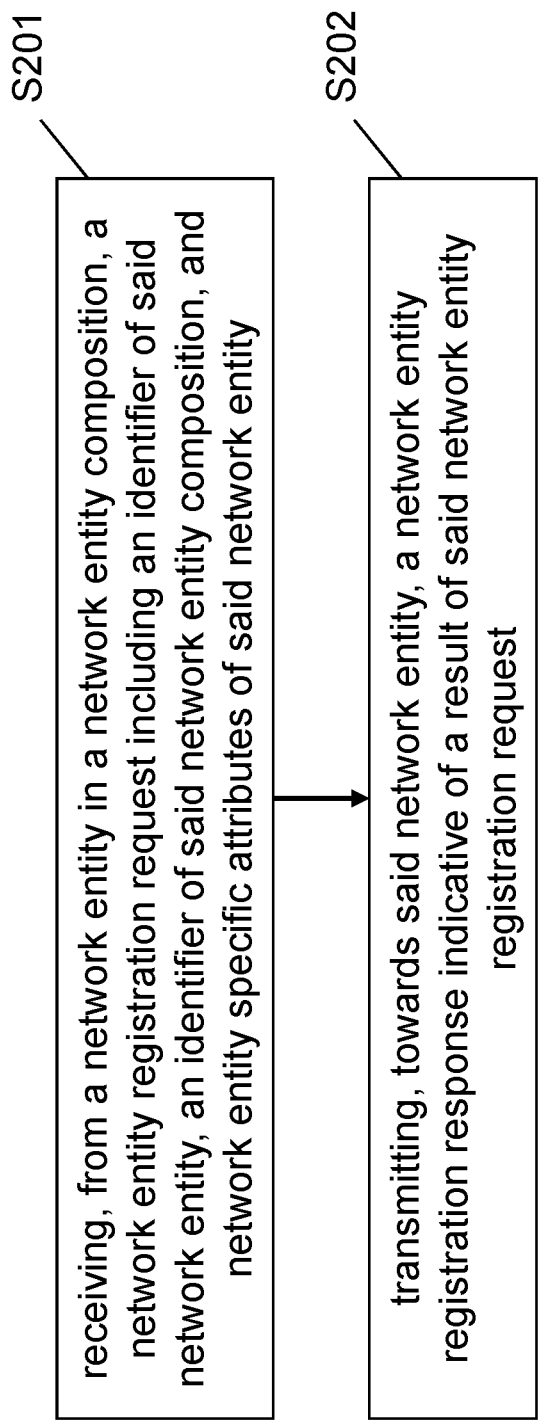
FIG. 20 is a schematic diagram of a procedure according to example embodiments.

FIG. 3 is a block diagram illustrating an apparatus according to example embodiments. The apparatus may be a network entity 30 such as a network repository function (NRF) (entity) comprising a receiving circuitry 31 and a transmitting circuitry 32. The receiving circuitry 31 receives, from a network entity in a network entity composition, a network entity registration request including an identifier of said network entity, an identifier of said network entity composition, and network entity specific attributes of said network entity. The transmitting circuitry 32 transmits, towards said network entity, a network entity registration response indicative of a result of said network entity registration request. FIG. 20 is a schematic diagram of a procedure according to example embodiments. The apparatus according to FIG. 3 may perform the method of FIG. 20 but is not limited to this method. The method of FIG. 20 may be performed by the apparatus of FIG. 3 but is not limited to being performed by this apparatus.

As shown in FIG. 20, a procedure according to example embodiments comprises an operation of receiving (S201), from a network entity in a network entity composition, a network entity registration request including an identifier of said network entity, an identifier of said network entity composition, and network entity specific attributes of said network entity, and an operation of transmitting (S202), towards said network entity, a network entity registration response indicative of a result of said network entity registration request.

Figure 4:
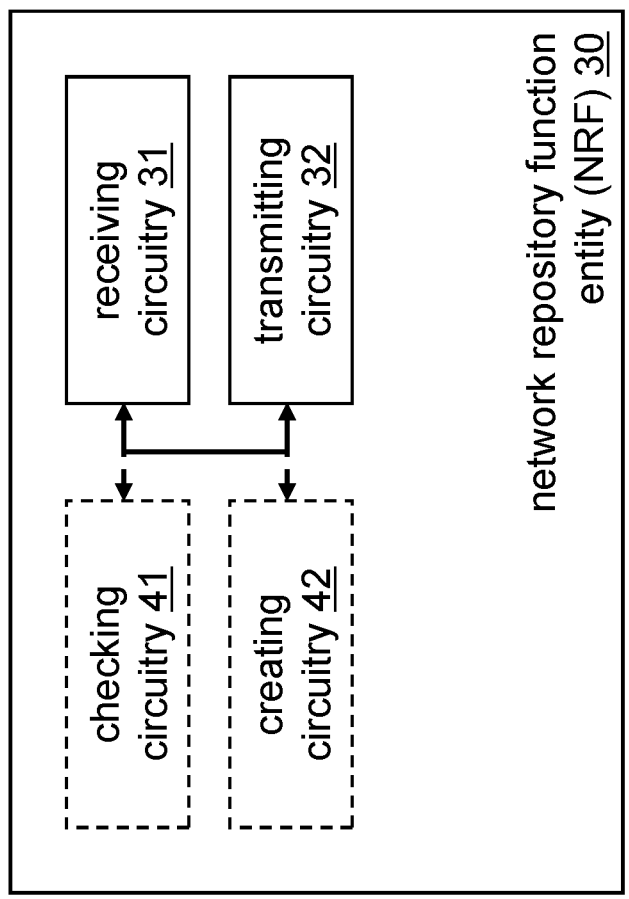
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise a checking circuitry 41, and/or a creating circuitry 42.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 20, exemplary additional operations are given, which are inherently independent from each other as such. According to such variation, an exemplary method according to example embodiments may comprise an operation of checking whether a profile for said network entity composition exists, and an operation of creating, if said profile for said network entity composition exists, said profile for said network entity based on said profile for said network entity composition and said network entity specific attributes of said network entity, wherein said network entity registration response indicates that said profile for said network entity is created.

According to further example embodiments, said network entity registration response includes said profile created for said network entity.

According to further example embodiments, said profile for said network entity is created such that a value of an attribute present in said profile for said network entity composition is overruled by a value of the same attribute present in said network entity specific attributes of said network entity.

According to a variation of the procedure shown in FIG. 20, exemplary additional operations are given, which are inherently independent from each other as such. According to such variation, an exemplary method according to example embodiments may comprise an operation of checking whether a profile for said network entity composition exists, wherein, if said profile for said network entity composition does not exist, said network entity registration response indicates that a profile for said network entity composition is missing.

According to a variation of the procedure shown in FIG. 20, exemplary additional operations are given, which are inherently independent from each other as such. According to such variation, an exemplary method according to example embodiments may comprise an operation of receiving, from said network entity, a composition profile registration request including said identifier of said network entity composition and said profile for said network entity composition.

According to a variation of the procedure shown in FIG. 20, exemplary additional operations are given, which are inherently independent from each other as such. According to such variation, an exemplary method according to example embodiments may comprise an operation of transmitting, towards said network entity, a composition profile registration response indicating that said profile for said network entity composition is created, wherein said composition profile registration response optionally includes said profile created for said network entity composition.

According to a variation of the procedure shown in FIG. 20, exemplary additional operations are given, which are inherently independent from each other as such. According to such variation, an exemplary method according to example embodiments may comprise an operation of receiving, from said network entity, said network entity registration request including said identifier of said network entity, said identifier of said network entity composition, and said network entity specific attributes of said network entity.

According to further example embodiments, said network entity composition is a network function set, said network entity is a network function instance, said profile for said network entity is a network function profile, and said profile for said network entity composition is a network function set profile.

Alternatively, according to further example embodiments, said network entity composition is a network function service set, said network entity is a network function instance, said profile for said network entity is a network function service profile, and said profile for said network entity composition is a network function service set profile.

Alternatively, according to further example embodiments, said network entity composition is a network function group, said network entity is a network function instance, said profile for said network entity is a network function profile, and said profile for said network entity composition is a network function group profile.

Figure 5:
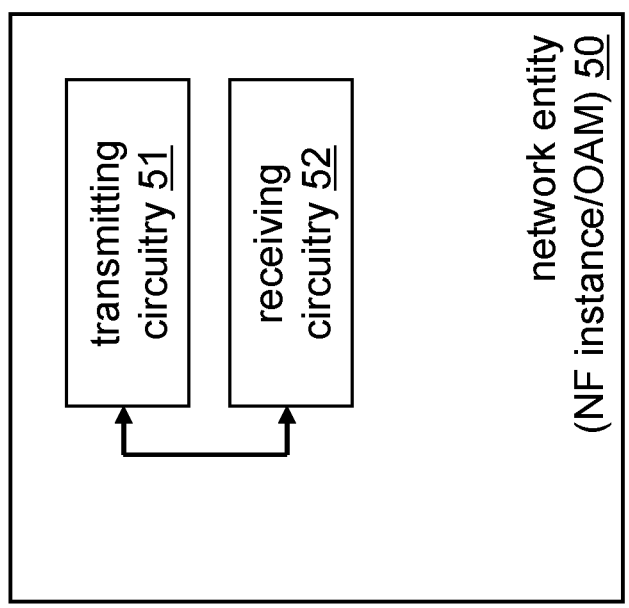
FIG. 5 is a block diagram illustrating an apparatus according to example embodiments.
Figure 21:
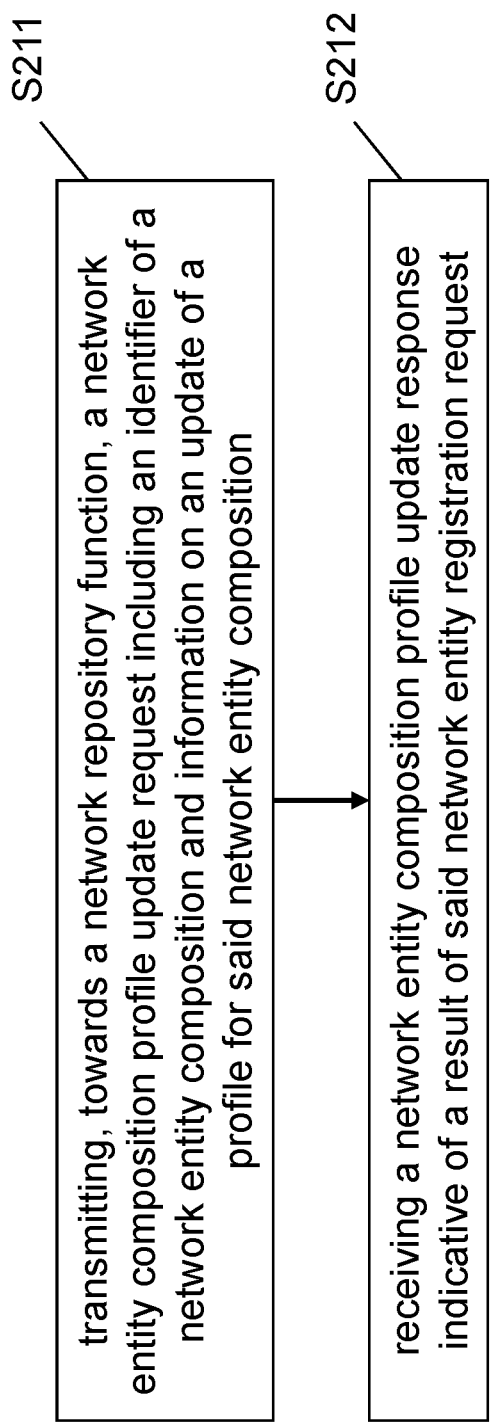
FIG. 21 is a schematic diagram of a procedure according to example embodiments.

FIG. 5 is a block diagram illustrating an apparatus according to example embodiments. The apparatus may be a network entity 50 such as a network function (NF) (entity) or an operation, administration, and maintenance (OAM) (entity) comprising a transmitting circuitry 51 and a receiving circuitry 52. The transmitting circuitry 51 transmits, towards a network repository function, a network entity composition profile update request including an identifier of a network entity composition and information on an update of a profile for said network entity composition. The receiving circuitry 52 receives a network entity composition profile update response indicative of a result of said network entity registration request. FIG. 21 is a schematic diagram of a procedure according to example embodiments. The apparatus according to FIG. 5 may perform the method of FIG. 21 but is not limited to this method. The method of FIG. 21 may be performed by the apparatus of FIG. 5 but is not limited to being performed by this apparatus.

As shown in FIG. 21, a procedure according to example embodiments comprises an operation of transmitting (S211), towards a network repository function, a network entity composition profile update request including an identifier of a network entity composition and information on an update of a profile for said network entity composition, and an operation of receiving (S212) a network entity composition profile update response indicative of a result of said network entity registration request.

In an embodiment at least some of the functionalities of the apparatus shown in FIG. 5 may be shared between two physically separate devices forming one operational entity. Therefore, the apparatus may be seen to depict the operational entity comprising one or more physically separate devices for executing at least some of the described processes.

According to further example embodiments, said information on said update of said profile for said network entity composition comprises information on attributes to be added, deleted, and/or replaced in said profile for said network entity composition.

Alternatively, according to further example embodiments, said information on said update of said profile for said network entity composition comprises an updated profile for said network entity composition.

According to further example embodiments, said network entity composition profile update response includes said profile updated for said network entity composition.

According to further example embodiments, said network entity composition is a network function set, said network entity is a network function instance or an operation, administration, and maintenance entity, and said profile for said network entity composition is a network function set profile.

Alternatively, according to further example embodiments, said network entity composition is a network function service set, said network entity is a network function instance or an operation, administration, and maintenance entity, and said profile for said network entity composition is a network function service set profile.

Alternatively, according to further example embodiments, said network entity composition is a network function group, said network entity is a network function instance or an operation, administration, and maintenance entity, and said profile for said network entity composition is a network function group profile.

Figure 6:
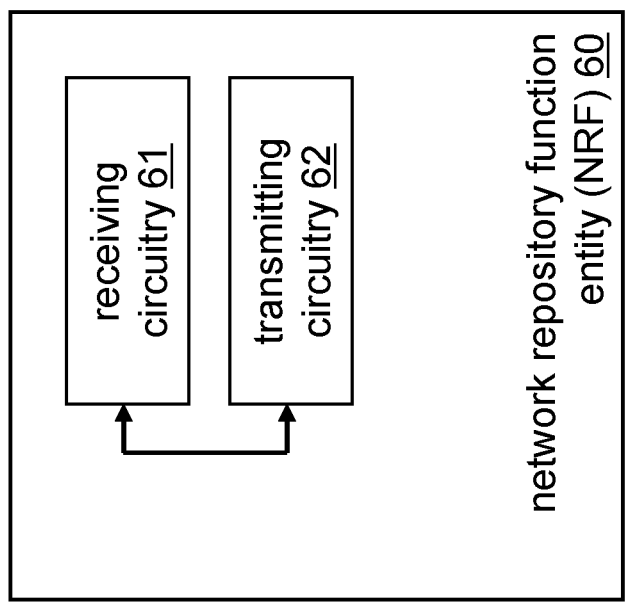
FIG. 6 is a block diagram illustrating an apparatus according to example embodiments.
Figure 22:
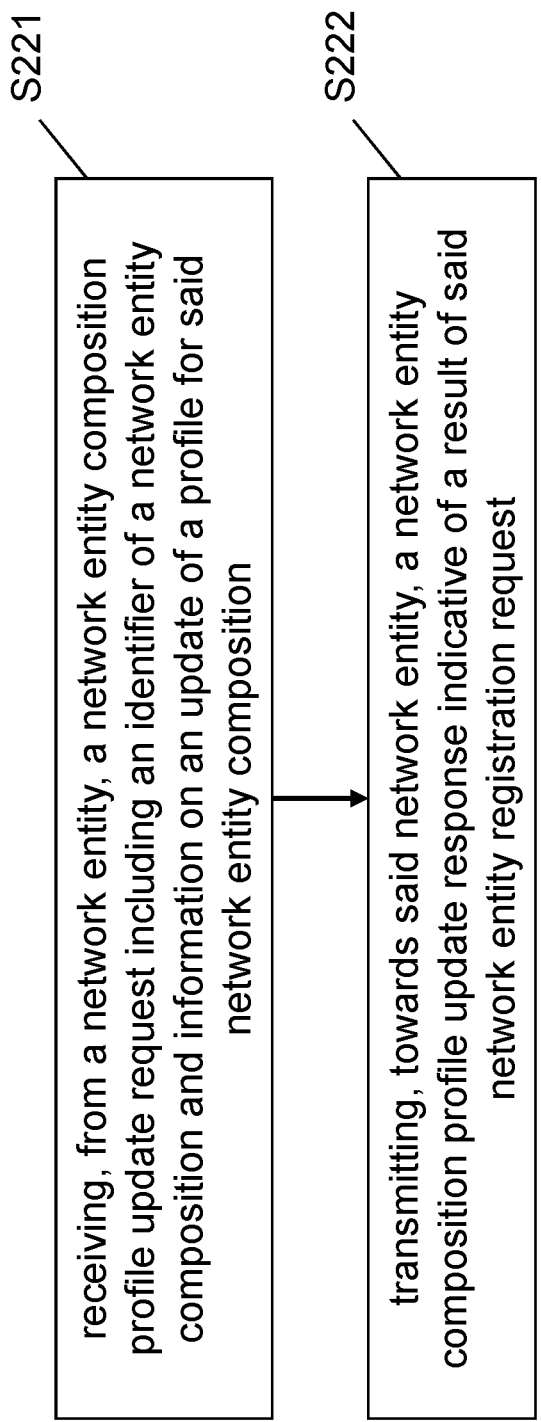
FIG. 22 is a schematic diagram of a procedure according to example embodiments.

FIG. 6 is a block diagram illustrating an apparatus according to example embodiments. The apparatus may be a network entity 60 such as a network repository function (NRF) (entity) comprising a receiving circuitry 61 and a transmitting circuitry 62. The receiving circuitry 61 receives, from a network entity, a network entity composition profile update request including an identifier of a network entity composition and information on an update of a profile for said network entity composition. The transmitting circuitry 62 transmits, towards said network entity, a network entity composition profile update response indicative of a result of said network entity registration request. FIG. 22 is a schematic diagram of a procedure according to example embodiments. The apparatus according to FIG. 6 may perform the method of FIG. 22 but is not limited to this method. The method of FIG. 22 may be performed by the apparatus of FIG. 6 but is not limited to being performed by this apparatus.

As shown in FIG. 22, a procedure according to example embodiments comprises an operation of receiving (S221), from a network entity, a network entity composition profile update request including an identifier of a network entity composition and information on an update of a profile for said network entity composition, and an operation of transmitting (S222), towards said network entity, a network entity composition profile update response indicative of a result of said network entity registration request.

In an embodiment at least some of the functionalities of the apparatus shown in FIG. 6 may be shared between two physically separate devices forming one operational entity. Therefore, the apparatus may be seen to depict the operational entity comprising one or more physically separate devices for executing at least some of the described processes.

According to a variation of the procedure shown in FIG. 22, exemplary additional operations are given, which are inherently independent from each other as such. According to such variation, said information on said update of said profile for said network entity composition comprises information on attributes to be added, deleted, and/or replaced in said profile for said network entity composition, or said information on said update of said profile for said network entity composition comprises an updated profile for said network entity composition, and an exemplary method according to example embodiments may comprise an operation of updating said profile for said network entity composition based on said information on said update of said profile for said network entity composition.

According to further example embodiments, said network entity composition profile update response includes said profile updated for said network entity composition.

According to further example embodiments, said network entity composition is a network function set, said network entity is a network function instance or an operation, administration, and maintenance entity, and said profile for said network entity composition is a network function set profile.

Alternatively, according to further example embodiments, said network entity composition is a network function service set, said network entity is a network function instance or an operation, administration, and maintenance entity, and said profile for said network entity composition is a network function service set profile.

Alternatively, according to further example embodiments, said network entity composition is a network function group, said network entity is a network function instance or an operation, administration, and maintenance entity, and said profile for said network entity composition is a network function group profile.

Figure 7:
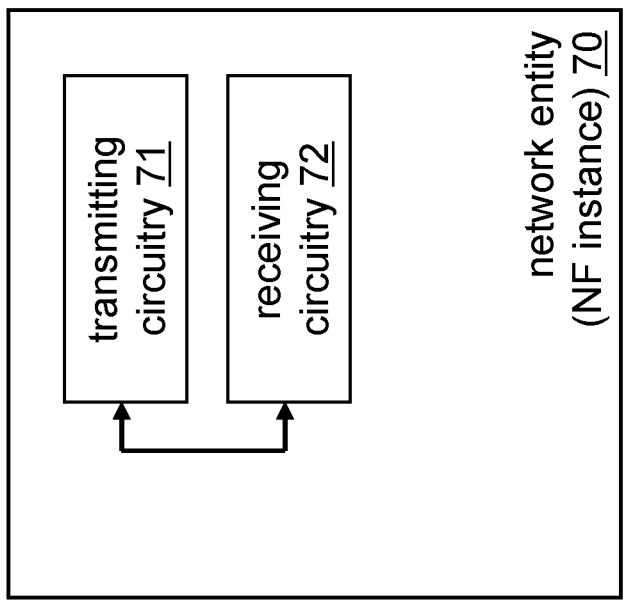
FIG. 7 is a block diagram illustrating an apparatus according to example embodiments.
Figure 23:
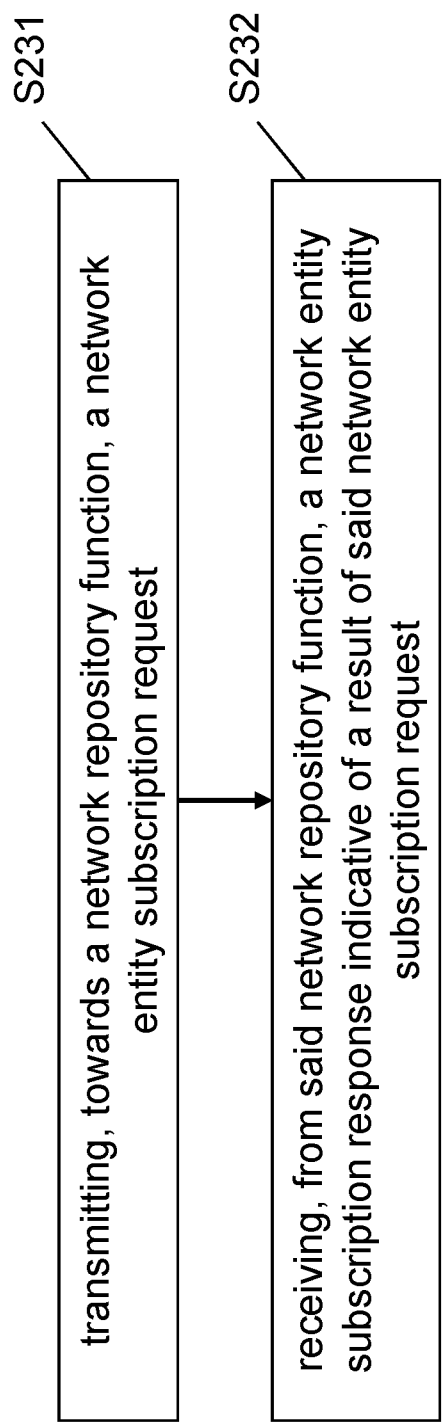
FIG. 23 is a schematic diagram of a procedure according to example embodiments.

FIG. 7 is a block diagram illustrating an apparatus according to example embodiments. The apparatus may be a network entity 70 such as a network function (NF) (entity) comprising a transmitting circuitry 71 and a receiving circuitry 72. The transmitting circuitry 71 transmits, towards a network repository function, a network entity subscription request. The receiving circuitry 72 receives, from said network repository function, a network entity subscription response indicative of a result of said network entity subscription request. FIG. 23 is a schematic diagram of a procedure according to example embodiments. The apparatus according to FIG. 7 may perform the method of FIG. 23 but is not limited to this method. The method of FIG. 23 may be performed by the apparatus of FIG. 7 but is not limited to being performed by this apparatus.

As shown in FIG. 23, a procedure according to example embodiments comprises an operation of transmitting (S231), towards a network repository function, a network entity subscription request, and an operation of receiving (S232), from said network repository function, a network entity subscription response indicative of a result of said network entity subscription request.

In an embodiment at least some of the functionalities of the apparatus shown in FIG. 7 may be shared between two physically separate devices forming one operational entity. Therefore, the apparatus may be seen to depict the operational entity comprising one or more physically separate devices for executing at least some of the described processes.

According to further example embodiments, said network entity subscription request includes an identifier of a network entity composition or an identifier of at least one network entity in a network entity composition and is indicative of that network entity composition profiles are supported for network entity subscription.

According to a variation of the procedure shown in FIG. 23, exemplary additional operations are given, which are inherently independent from each other as such. According to such variation, an exemplary method according to example embodiments may comprise an operation of receiving, from said network repository function, a status notification related to said network entity subscription request, said status notification including an updated profile for said network entity composition.

According to a variation of the procedure shown in FIG. 23, exemplary additional operations are given, which are inherently independent from each other as such. According to such variation, said network entity subscription request includes an identifier of at least one network entity in a network entity composition, and an exemplary method according to example embodiments may comprise an operation of receiving, from said network repository function, a status notification related to said network entity subscription request, said status notification including an updated profile for said at least one network entity.

According to further example embodiments, said network entity composition is a network function set, said network entity is a network function instance, and said profile for said network entity composition is a network function set profile.

Alternatively, according to further example embodiments, said network entity composition is a network function service set, said network entity is a network function instance, and said profile for said network entity composition is a network function service set profile.

Alternatively, according to further example embodiments, said network entity composition is a network function group, and said profile for said network entity composition is a network function group profile.

Figure 8:
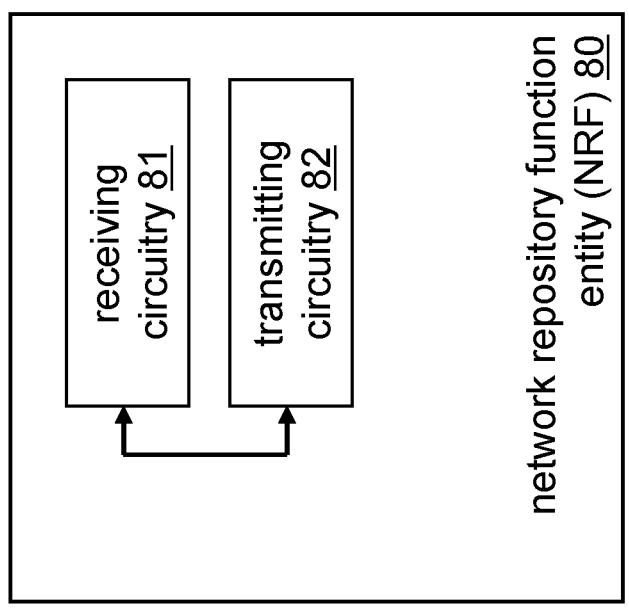
FIG. 8 is a block diagram illustrating an apparatus according to example embodiments.
Figure 24:
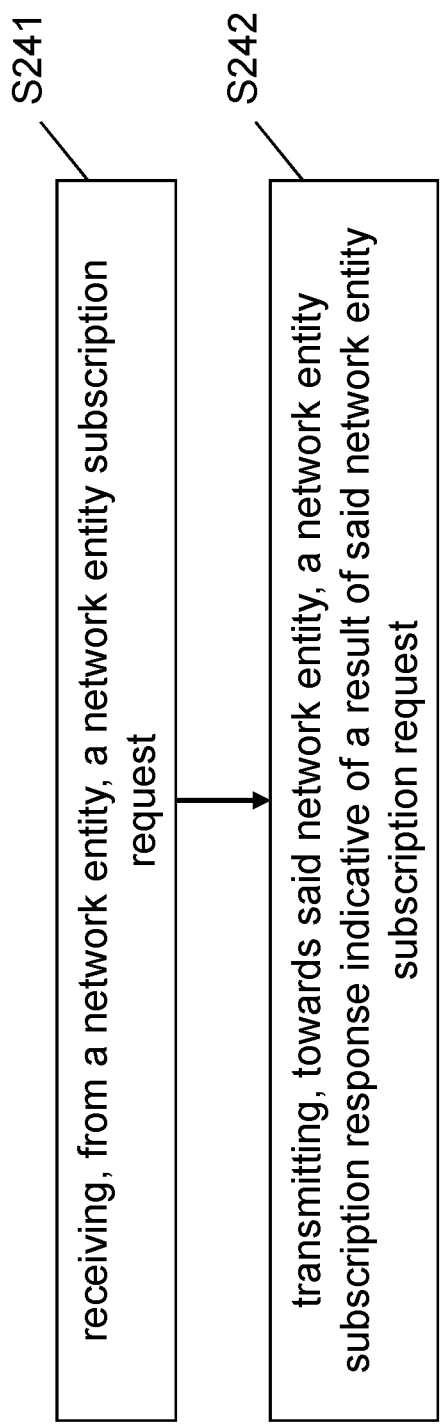
FIG. 24 is a schematic diagram of a procedure according to example embodiments.

FIG. 8 is a block diagram illustrating an apparatus according to example embodiments. The apparatus may be a network entity 80 such as a network repository function (NRF) (entity) comprising a receiving circuitry 81 and a transmitting circuitry 82. The receiving circuitry 81 receives, from a network entity, a network entity subscription request. The transmitting circuitry 82 transmits, towards said network entity, a network entity subscription response indicative of a result of said network entity subscription request. FIG. 24 is a schematic diagram of a procedure according to example embodiments. The apparatus according to FIG. 8 may perform the method of FIG. 24 but is not limited to this method. The method of FIG. 24 may be performed by the apparatus of FIG. 8 but is not limited to being performed by this apparatus.

As shown in FIG. 24, a procedure according to example embodiments comprises an operation of receiving (S241), from a network entity, a network entity subscription request, and an operation of transmitting (S242), towards said network entity, a network entity subscription response indicative of a result of said network entity subscription request.

Figure 9:
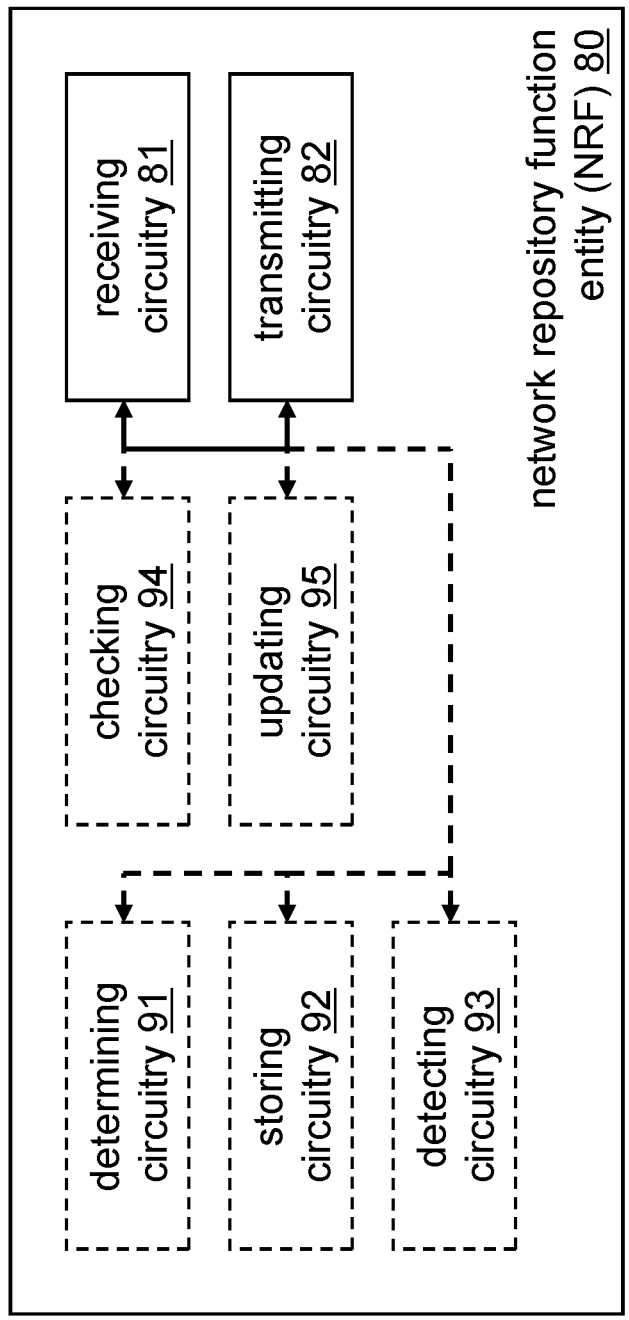
FIG. 9 is a block diagram illustrating an apparatus according to example embodiments.

FIG. 9 is a block diagram illustrating an apparatus according to example embodiments. In particular, FIG. 9 illustrates a variation of the apparatus shown in FIG. 8. The apparatus according to FIG. 9 may thus further comprise a determining circuitry 91, a storing circuitry 92, a detecting circuitry 93, a checking circuitry 94, and/or an updating circuitry 95.

In an embodiment at least some of the functionalities of the apparatus shown in FIG. 8 (or 9) may be shared between two physically separate devices forming one operational entity. Therefore, the apparatus may be seen to depict the operational entity comprising one or more physically separate devices for executing at least some of the described processes.

According to a variation of the procedure shown in FIG. 24, exemplary additional operations are given, which are inherently independent from each other as such. According to such variation, said network entity subscription request includes an identifier of a network entity composition or an identifier of at least one network entity in a network entity composition and is indicative of that network entity composition profiles are supported for network entity subscription, and an exemplary method according to example embodiments may comprise an operation of determining that said network entity supports network entity composition profiles for said network entity subscription based on that said network entity subscription request is indicative of that network entity composition profiles are supported for said network entity subscription, and an operation of storing said network entity subscription.

According to a variation of the procedure shown in FIG. 24, exemplary additional operations are given, which are inherently independent from each other as such. According to such variation, an exemplary method according to example embodiments may comprise an operation of detecting an update of a profile for said network entity composition, and an operation of transmitting, towards said network entity, a status notification related to said network entity subscription request, said status notification including an updated profile for said network entity composition.

According to a variation of the procedure shown in FIG. 24, exemplary additional operations are given, which are inherently independent from each other as such. According to such variation, said network entity subscription request includes an identifier of a network entity composition or an identifier of at least one network entity in a network entity composition, and an exemplary method according to example embodiments may comprise an operation of checking whether said network entity subscription request is indicative of that network entity composition profiles are supported for network entity subscription, an operation of determining, if said network entity subscription request is not indicative of that network entity composition profiles are supported for said network entity subscription, that said network entity does not support network entity composition profiles for said network entity subscription, and an operation of storing said network entity subscription.

According to a variation of the procedure shown in FIG. 24, exemplary additional operations are given, which are inherently independent from each other as such. According to such variation, an exemplary method according to example embodiments may comprise an operation of detecting an update of a profile for said network entity composition, an operation of updating a profile for said at least one network entity based on said update of said profile for said network entity composition, and an operation of transmitting, towards said network entity, a status notification related to said network entity subscription request, said status notification including said updated profile for said at least one network entity.

According to further example embodiments, said profile for said network entity is updated such that a value of an attribute present in said update of said profile for said network entity composition is overruled by a value of the same attribute present in network entity specific attributes of said network entity.

According to further example embodiments, said network entity composition is a network function set, said network entity is a network function instance, and said profile for said network entity composition is a network function set profile.

Alternatively, according to further example embodiments, said network entity composition is a network function service set, said network entity is a network function instance, and said profile for said network entity composition is a network function service set profile.

Alternatively, according to further example embodiments, said network entity composition is a network function group, and said profile for said network entity composition is a network function group profile.

Figure 10:
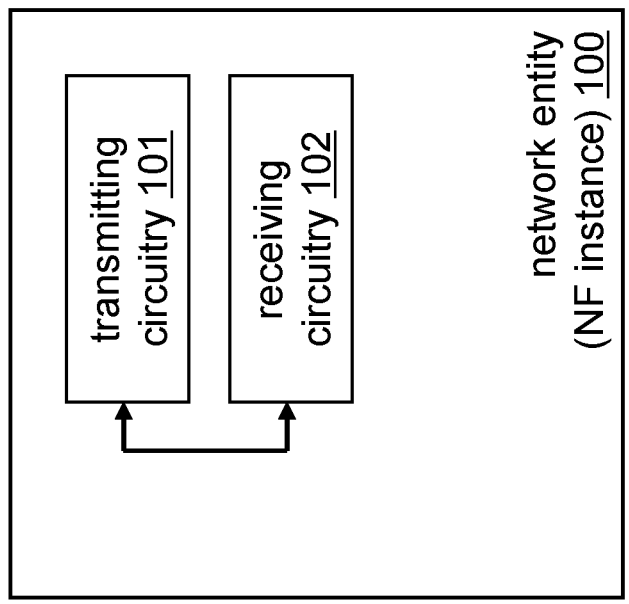
FIG. 10 is a block diagram illustrating an apparatus according to example embodiments.
Figure 25:
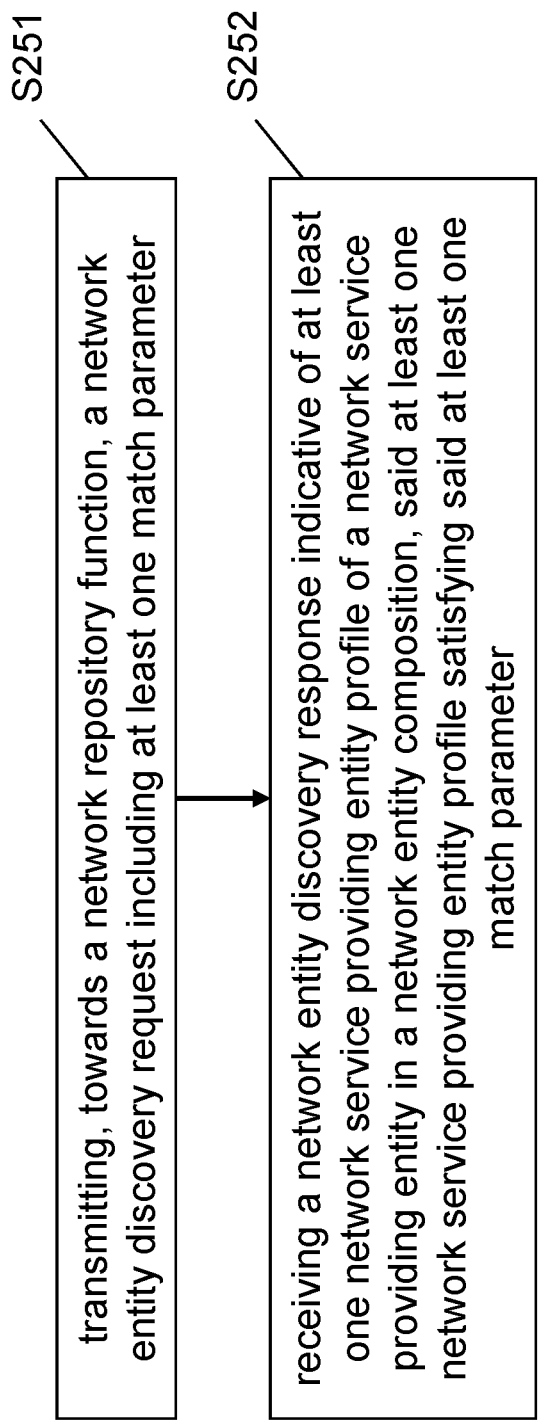
FIG. 25 is a schematic diagram of a procedure according to example embodiments.

FIG. 10 is a block diagram illustrating an apparatus according to example embodiments. The apparatus may be a network entity 100 such as a network function (NF) (entity) comprising a transmitting circuitry 101 and a receiving circuitry 102. The transmitting circuitry 101 transmits, towards a network repository function, a network entity discovery request including at least one match parameter. The receiving circuitry 102 receives a network entity discovery response indicative of at least one network service providing entity profile of a network service providing entity in a network entity composition, said at least one network service providing entity profile satisfying said at least one match parameter. FIG. 25 is a schematic diagram of a procedure according to example embodiments. The apparatus according to FIG. 10 may perform the method of FIG. 25 but is not limited to this method. The method of FIG. 25 may be performed by the apparatus of FIG. 10 but is not limited to being performed by this apparatus.

As shown in FIG. 25, a procedure according to example embodiments comprises an operation of transmitting (S251), towards a network repository function, a network entity discovery request including at least one match parameter, and an operation of receiving (S252) a network entity discovery response indicative of at least one network service providing entity profile of a network service providing entity in a network entity composition, said at least one network service providing entity profile satisfying said at least one match parameter.

Figure 11:
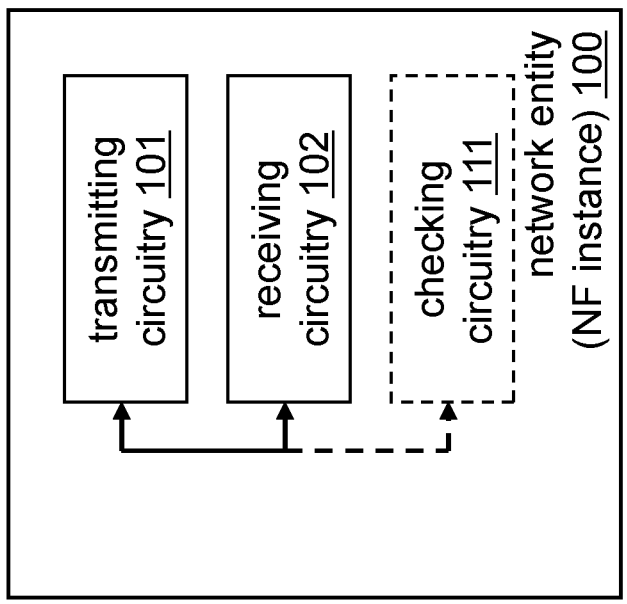
FIG. 11 is a block diagram illustrating an apparatus according to example embodiments.

FIG. 11 is a block diagram illustrating an apparatus according to example embodiments. In particular, FIG. 11 illustrates a variation of the apparatus shown in FIG. 10. The apparatus according to FIG. 11 may thus further comprise a checking circuitry 111.

In an embodiment at least some of the functionalities of the apparatus shown in FIG. 10 (or 11) may be shared between two physically separate devices forming one operational entity. Therefore, the apparatus may be seen to depict the operational entity comprising one or more physically separate devices for executing at least some of the described processes.

According to further example embodiments, said network entity discovery request is indicative of that network entity composition profiles are supported for network entity discovery.

According to further example embodiments, said network entity discovery response includes said at least one network service providing entity profile comprising an identifier of said network entity composition.

According to further example embodiments, said network entity discovery response includes a profile for said network entity composition.

According to a variation of the procedure shown in FIG. 25, exemplary additional operations are given, which are inherently independent from each other as such. According to such variation, an exemplary method according to example embodiments may comprise an operation of checking whether a profile for said network entity composition exists, an operation of transmitting, if said profile for said network entity composition does not exist, towards said network repository function, a network entity composition profile request including said identifier of said network entity composition, and an operation of receiving a network entity composition profile response including said profile for said network entity composition.

According to further example embodiments, said network entity discovery request is not indicative of that network entity composition profiles are supported for said network entity discovery, and said network entity discovery response includes said at least one network service providing entity profile comprising profile content of a profile for said network entity composition.

According to further example embodiments, said network entity composition is a network function set, said network service providing entity is a network function instance, said network service providing entity profile is a network function profile, and said profile for said network entity composition is a network function set profile.

Alternatively, according to further example embodiments, said network entity composition is a network function service set, said network service providing entity is a network function instance, said network service providing entity profile is a network function service profile, and said profile for said network entity composition is a network function service set profile.

Alternatively, according to further example embodiments, said network entity composition is a network function group, said network service providing entity is a network function instance, said network service providing entity profile is a network function profile, and said profile for said network entity composition is a network function group profile.

Figure 12:
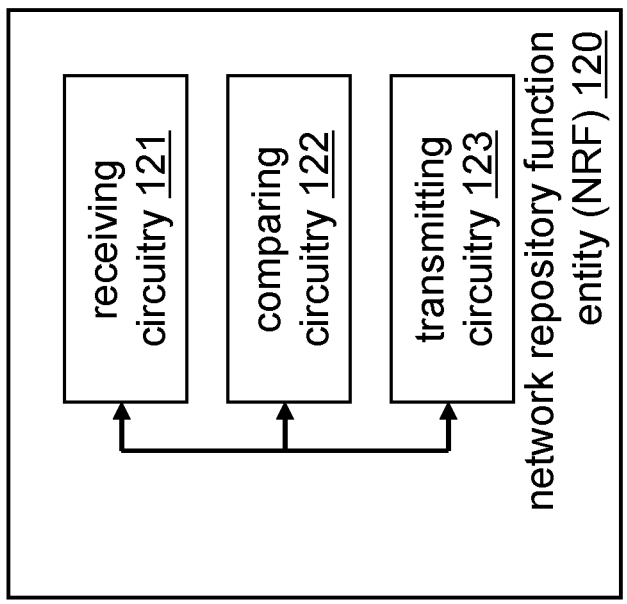
FIG. 12 is a block diagram illustrating an apparatus according to example embodiments.
Figure 26:
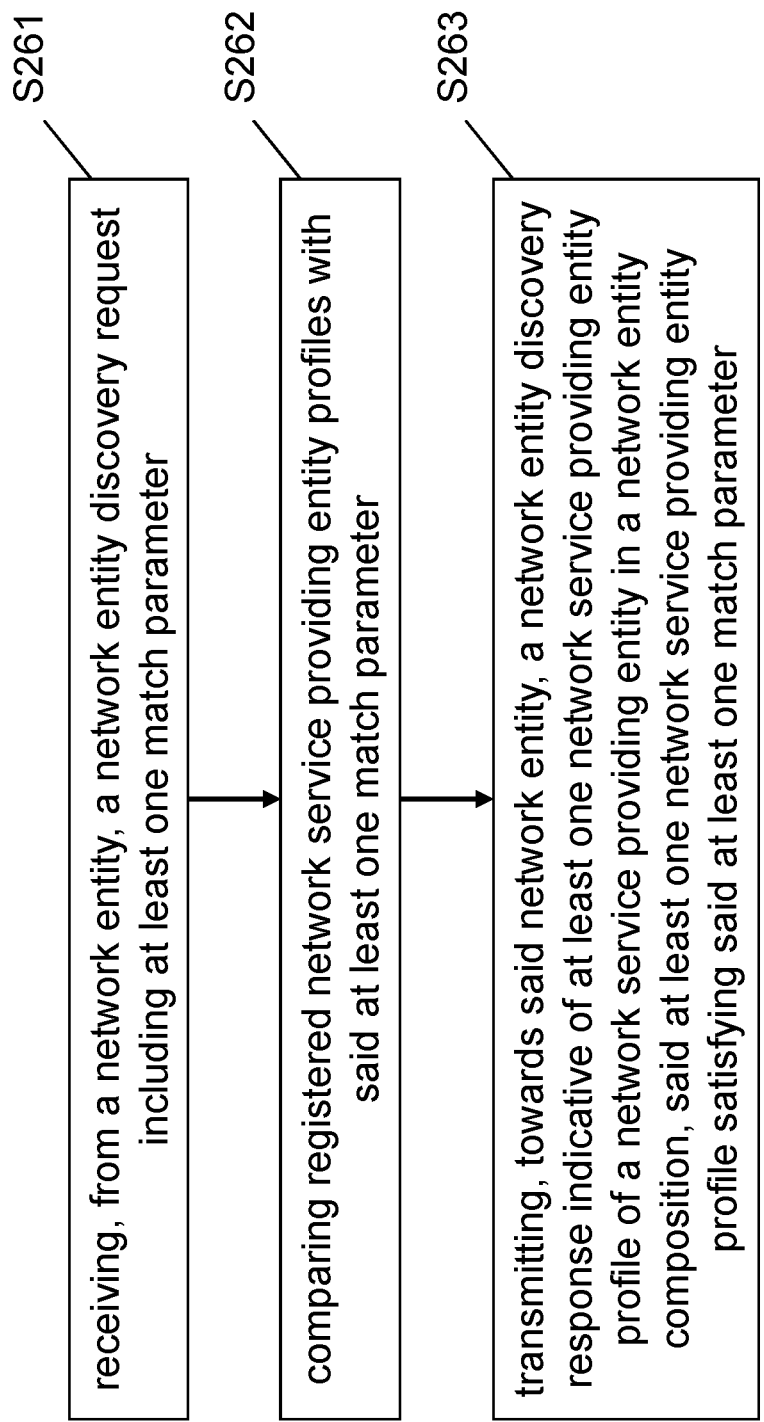
FIG. 26 is a schematic diagram of a procedure according to example embodiments.

FIG. 12 is a block diagram illustrating an apparatus according to example embodiments. The apparatus may be a network entity 120 such as a network repository function (NRF) (entity) comprising a receiving circuitry 121, a comparing circuitry 122, and a transmitting circuitry 123. The receiving circuitry 121 receives, from a network entity, a network entity discovery request including at least one match parameter. The comparing circuitry 122 compares registered network service providing entity profiles with said at least one match parameter. The transmitting circuitry 123 transmits, towards said network entity, a network entity discovery response indicative of at least one network service providing entity profile of a network service providing entity in a network entity composition, said at least one network service providing entity profile satisfying said at least one match parameter. FIG. 26 is a schematic diagram of a procedure according to example embodiments. The apparatus according to FIG. 12 may perform the method of FIG. 26 but is not limited to this method. The method of FIG. 26 may be performed by the apparatus of FIG. 12 but is not limited to being performed by this apparatus.

As shown in FIG. 26, a procedure according to example embodiments comprises an operation of receiving (S261), from a network entity, a network entity discovery request including at least one match parameter, an operation of comparing (S262) registered network service providing entity profiles with said at least one match parameter, and an operation of transmitting (S263), towards said network entity, a network entity discovery response indicative of at least one network service providing entity profile of a network service providing entity in a network entity composition, said at least one network service providing entity profile satisfying said at least one match parameter.

Figure 13:
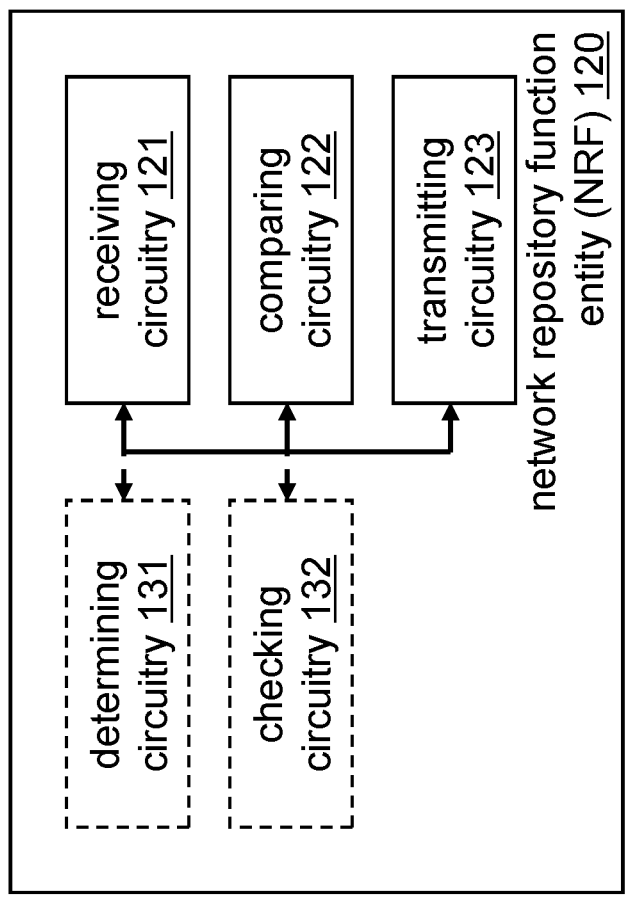
FIG. 13 is a block diagram illustrating an apparatus according to example embodiments.

FIG. 13 is a block diagram illustrating an apparatus according to example embodiments. In particular, FIG. 13 illustrates a variation of the apparatus shown in FIG. 12. The apparatus according to FIG. 13 may thus further comprise a determining circuitry 131, and/or a checking circuitry 132.

In an embodiment at least some of the functionalities of the apparatus shown in FIG. 12 (or 13) may be shared between two physically separate devices forming one operational entity. Therefore, the apparatus may be seen to depict the operational entity comprising one or more physically separate devices for executing at least some of the described processes.

According to a variation of the procedure shown in FIG. 26, exemplary additional operations are given, which are inherently independent from each other as such. According to such variation, said network entity discovery request is indicative of that network entity composition profiles are supported for network entity discovery, and an exemplary method according to example embodiments may comprise an operation of determining that said network entity supports network entity composition profiles for said network entity discovery based on that said network entity discovery request is indicative of that network entity composition profiles are supported for said network entity discovery, and an operation of determining that said at least one network service providing entity profile satisfying said at least one match parameter is in said network entity composition.

According to further example embodiments, said network entity discovery response includes said at least one network service providing entity profile comprising an identifier of said network entity composition.

According to further example embodiments, said network entity discovery response includes a profile for said network entity composition.

According to a variation of the procedure shown in FIG. 26, exemplary additional operations are given, which are inherently independent from each other as such. According to such variation, an exemplary method according to example embodiments may comprise an operation of receiving, from said network entity, a network entity composition profile request including said identifier of said network entity composition, and an operation of transmitting, towards said network entity, a network entity composition profile response including said profile for said network entity composition.

According to a variation of the procedure shown in FIG. 26, exemplary additional operations are given, which are inherently independent from each other as such. According to such variation, an exemplary method according to example embodiments may comprise an operation of checking whether said network entity discovery request is indicative of that network entity composition profiles are supported for network entity discovery, an operation of determining, if said network entity discovery request is not indicative of that network entity composition profiles are supported for said network entity discovery, that said network entity does not support network entity composition profiles for said network entity discovery, and an operation of determining that said at least one network service providing entity profile satisfying said at least one match parameter is in said network entity composition.

According to further example embodiments, if said network entity does not support network entity composition profiles for said network entity discovery, said network entity discovery response includes said at least one network service providing entity profile comprising profile content of a profile for said network entity composition.

According to further example embodiments, said network entity composition is a network function set, said network service providing entity is a network function instance, said network service providing entity profile is a network function profile, and said profile for said network entity composition is a network function set profile.

Alternatively, according to further example embodiments, said network entity composition is a network function service set, said network service providing entity is a network function instance, said network service providing entity profile is a network function service profile, and said profile for said network entity composition is a network function service set profile.

Alternatively, according to further example embodiments, said network entity composition is a network function group, said network service providing entity is a network function instance, said network service providing entity profile is a network function profile, and said profile for said network entity composition is a network function group profile.

Figure 14:
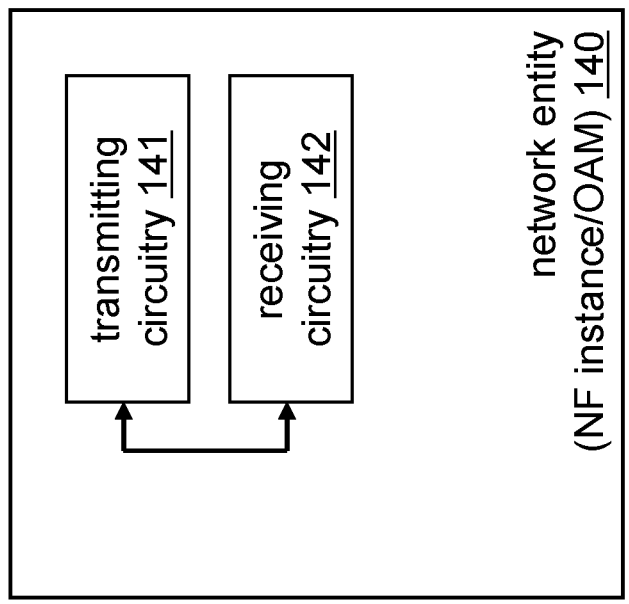
FIG. 14 is a block diagram illustrating an apparatus according to example embodiments.
Figure 27:
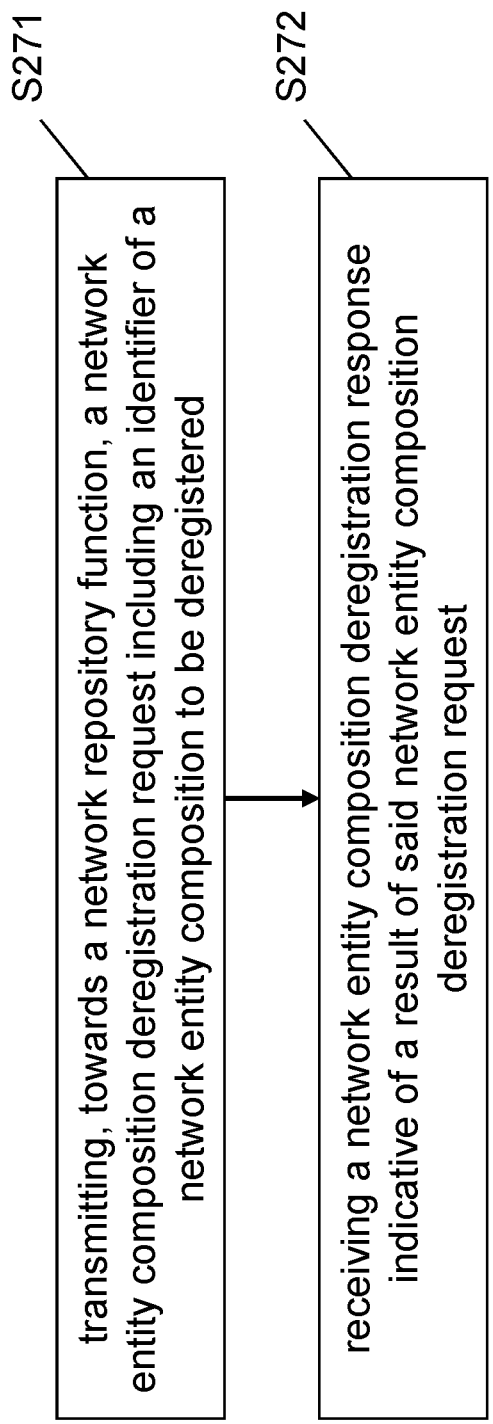
FIG. 27 is a schematic diagram of a procedure according to example embodiments.

FIG. 14 is a block diagram illustrating an apparatus according to example embodiments. The apparatus may be a network entity 140 such as a network function (NF) (entity) or an operation, administration, and maintenance (OAM) (entity) comprising a transmitting circuitry 141 and a receiving circuitry 142. The transmitting circuitry 141 transmits, towards a network repository function, a network entity composition deregistration request including an identifier of a network entity composition to be deregistered. The receiving circuitry 142 receives a network entity composition deregistration response indicative of a result of said network entity composition deregistration request. FIG. 27 is a schematic diagram of a procedure according to example embodiments. The apparatus according to FIG. 14 may perform the method of FIG. 27 but is not limited to this method. The method of FIG. 27 may be performed by the apparatus of FIG. 14 but is not limited to being performed by this apparatus.

As shown in FIG. 27, a procedure according to example embodiments comprises an operation of transmitting (S271), towards a network repository function, a network entity composition deregistration request including an identifier of a network entity composition to be deregistered, and an operation of receiving (S272) a network entity composition deregistration response indicative of a result of said network entity composition deregistration request.

Figure 15:
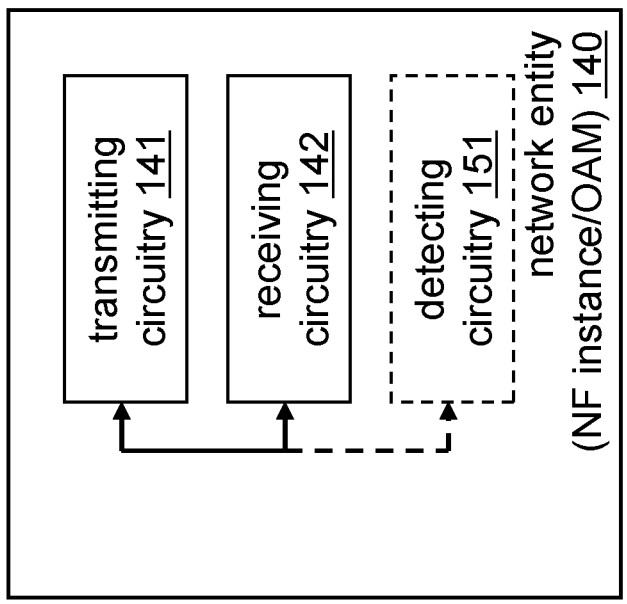
FIG. 15 is a block diagram illustrating an apparatus according to example embodiments.

FIG. 15 is a block diagram illustrating an apparatus according to example embodiments. In particular, FIG. 15 illustrates a variation of the apparatus shown in FIG. 14. The apparatus according to FIG. 15 may thus further comprise a detecting circuitry 151.

In an embodiment at least some of the functionalities of the apparatus shown in FIG. 14 (or 15) may be shared between two physically separate devices forming one operational entity. Therefore, the apparatus may be seen to depict the operational entity comprising one or more physically separate devices for executing at least some of the described processes.

According to a variation of the procedure shown in FIG. 27, exemplary additional operations are given, which are inherently independent from each other as such. According to such variation, said network entity is in said network entity composition, and an exemplary method according to example embodiments may comprise an operation of detecting that said network entity is a last member in said network entity composition, wherein said network entity composition deregistration request is a request to delete said network entity composition to be deregistered.

According to a variation of the procedure shown in FIG. 27, exemplary additional operations are given, which are inherently independent from each other as such. According to such variation, said network entity is an operation, administration, and maintenance entity, and an exemplary method according to example embodiments may comprise an operation of detecting that a member network entity to be deregistered is a last member in said network entity composition, wherein said network entity composition deregistration request is a request to delete said network entity composition to be deregistered.

According to further example embodiments, said network entity composition is a network function set, and said last member in said network entity composition is a network function entity.

Alternatively, according to further example embodiments, said network entity composition is a network function service set, and said last member in said network entity composition is a network function entity.

Alternatively, according to further example embodiments, said network entity composition is a network function group, and said last member in said network entity composition is a network function entity.

Figure 16:
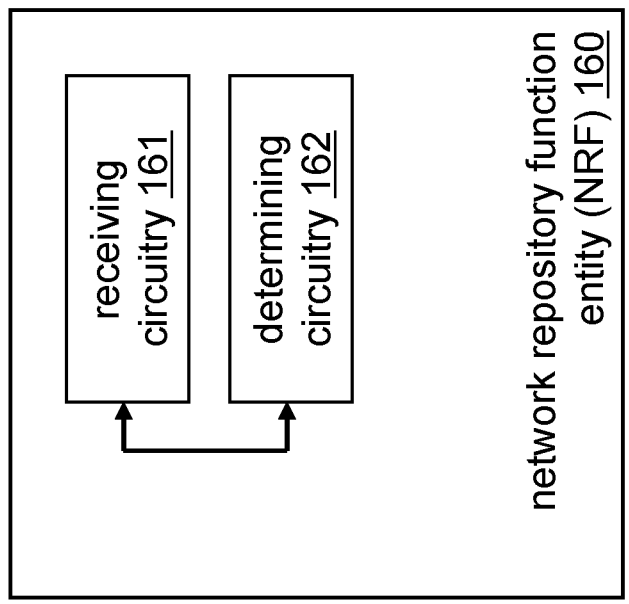
FIG. 16 is a block diagram illustrating an apparatus according to example embodiments.
Figure 28:
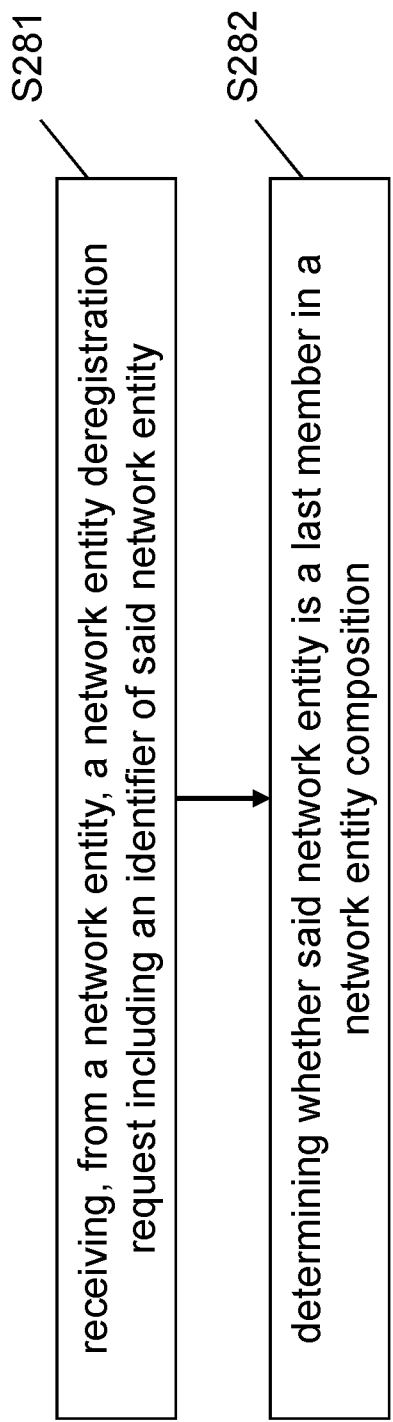
FIG. 28 is a schematic diagram of a procedure according to example embodiments.

FIG. 16 is a block diagram illustrating an apparatus according to example embodiments. The apparatus may be a network entity 160 such as a network repository function (NRF) (entity) comprising a receiving circuitry 161, and a determining circuitry 162. The receiving circuitry 161 receives, from a network entity, a network entity deregistration request including an identifier of said network entity. The determining circuitry 162 determines whether said network entity is a last member in a network entity composition. FIG. 28 is a schematic diagram of a procedure according to example embodiments. The apparatus according to FIG. 16 may perform the method of FIG. 28 but is not limited to this method. The method of FIG. 28 may be performed by the apparatus of FIG. 16 but is not limited to being performed by this apparatus.

As shown in FIG. 28, a procedure according to example embodiments comprises an operation of receiving (S281), from a network entity, a network entity deregistration request including an identifier of said network entity, and an operation of determining (S282) whether said network entity is a last member in a network entity composition.

Figure 17:
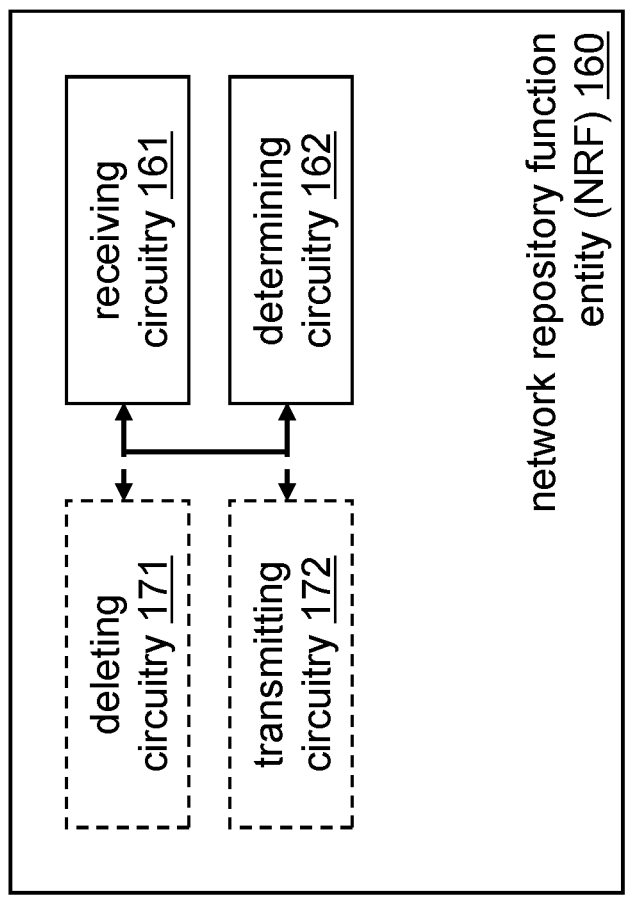
FIG. 17 is a block diagram illustrating an apparatus according to example embodiments.

FIG. 17 is a block diagram illustrating an apparatus according to example embodiments. In particular, FIG. 17 illustrates a variation of the apparatus shown in FIG. 16. The apparatus according to FIG. 17 may thus further comprise a deleting circuitry 171, and/or a transmitting circuitry 172.

In an embodiment at least some of the functionalities of the apparatus shown in FIG. 16 (or 17) may be shared between two physically separate devices forming one operational entity. Therefore, the apparatus may be seen to depict the operational entity comprising one or more physically separate devices for executing at least some of the described processes.

According to a variation of the procedure shown in FIG. 28, exemplary additional operations are given, which are inherently independent from each other as such. According to such variation, an exemplary method according to example embodiments may comprise an operation of deleting, if said network entity is said last member in said network entity composition, a profile for said network entity composition.

According to a variation of the procedure shown in FIG. 28, exemplary additional operations are given, which are inherently independent from each other as such. According to such variation, an exemplary method according to example embodiments may comprise an operation of transmitting, towards said network entity, a network entity composition deregistration response indicative of a result of said network entity deregistration request.

According to further example embodiments, said network entity composition is a network function set, said network entity is a network function instance, and said profile for said network entity composition is a network function set profile.

Alternatively, according to further example embodiments, said network entity composition is a network function service set, said network entity is a network function instance, and said profile for said network entity composition is a network function service set profile.

Alternatively, according to further example embodiments, said network entity composition is a network function group, said network entity is a network function instance, and said profile for said network entity composition is a network function group profile.

Figure 18:
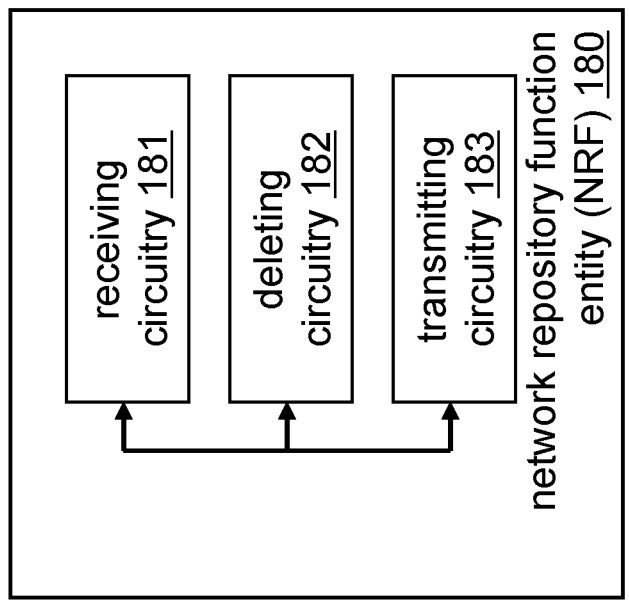
FIG. 18 is a block diagram illustrating an apparatus according to example embodiments.
Figure 29:
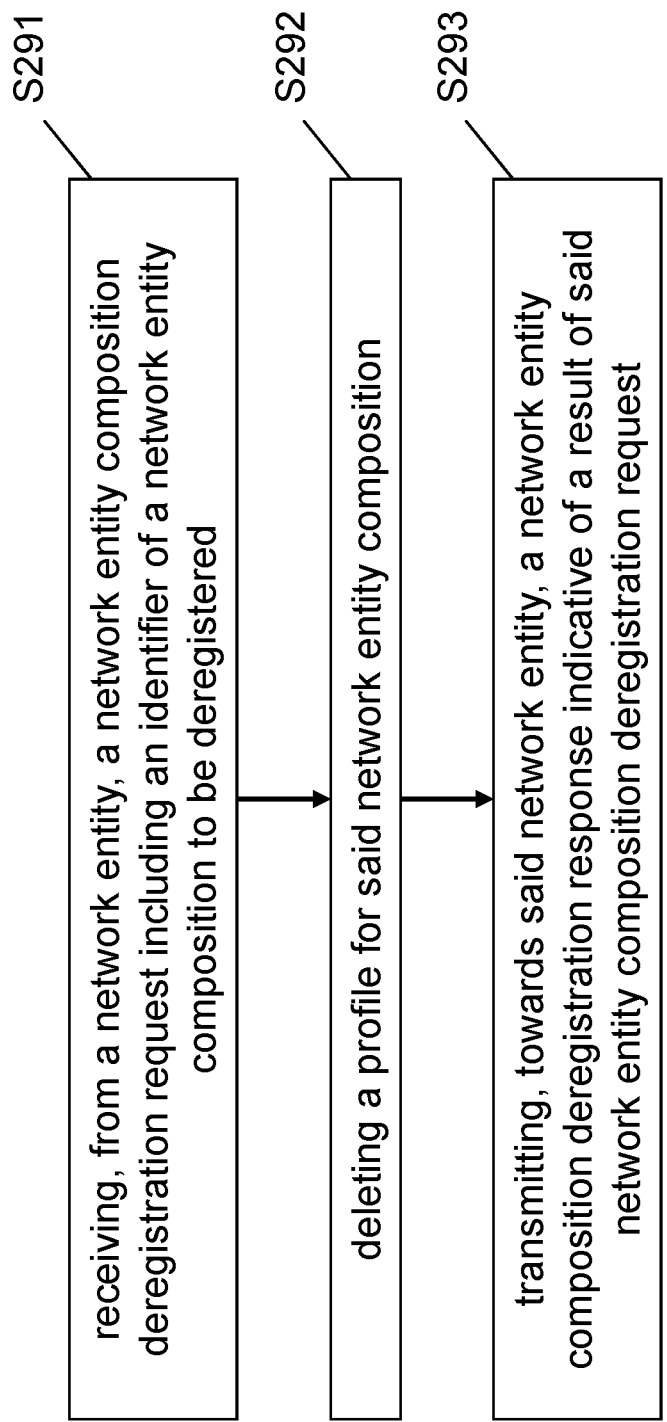
FIG. 29 is a schematic diagram of a procedure according to example embodiments.
Figure 30:
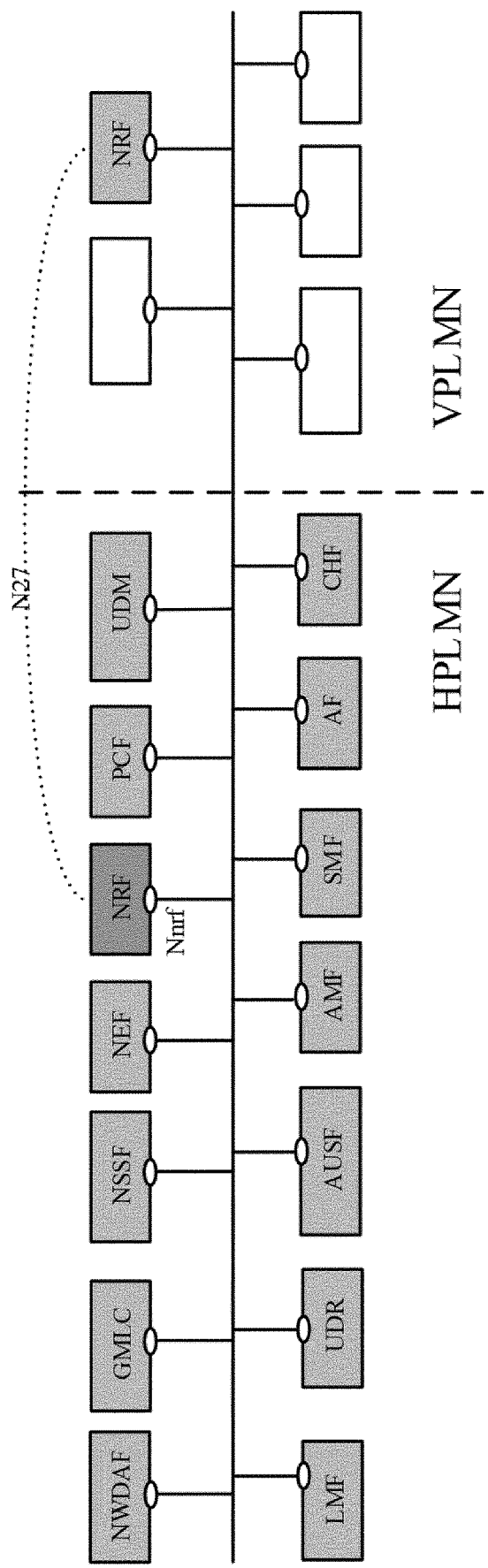
FIG. 30 shows a schematic diagram of an example of a system environment.
Figure 31:
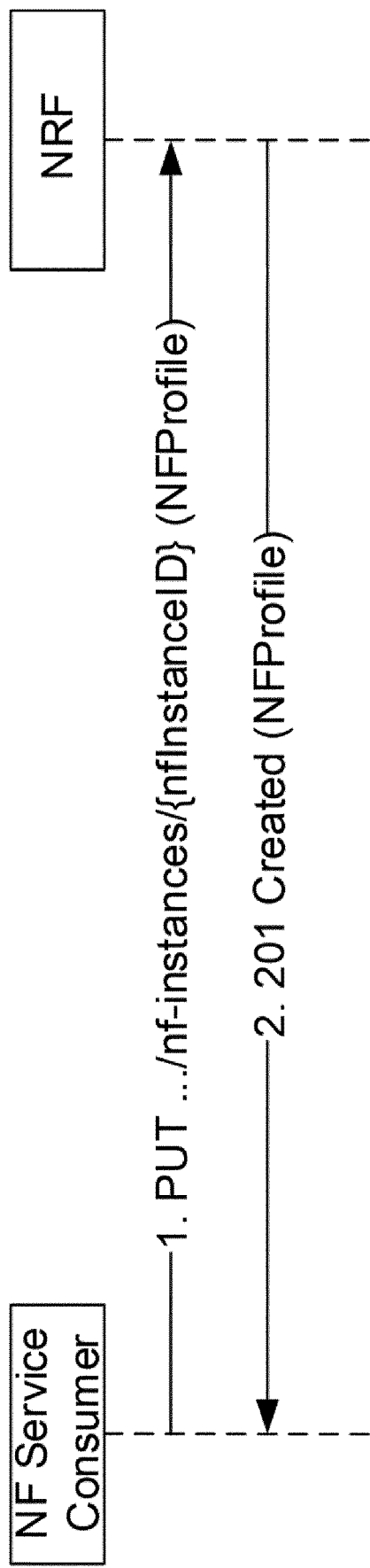
FIG. 31 shows a schematic diagram of signaling sequences.
Figure 32:
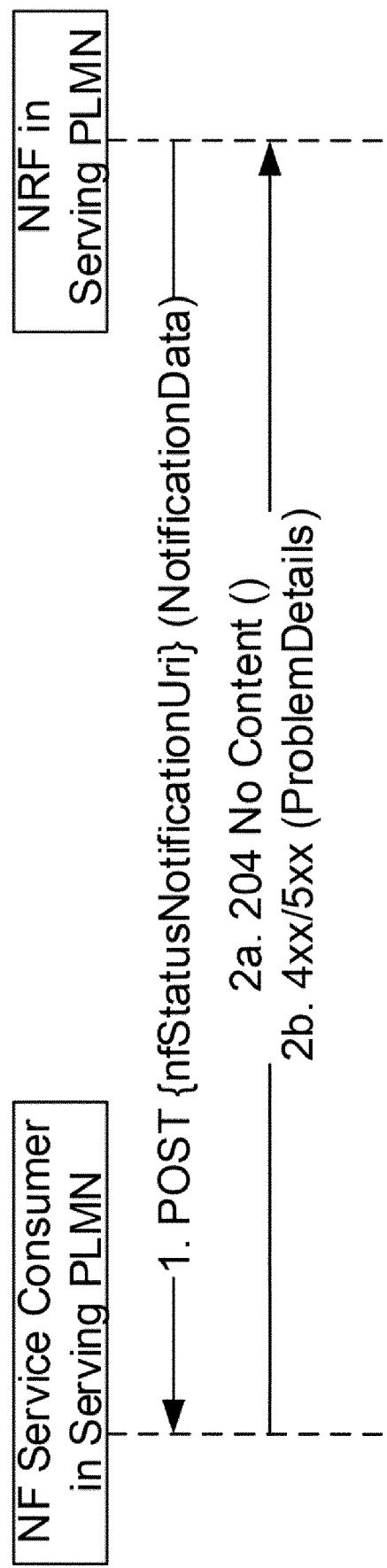
FIG. 32 shows a schematic diagram of signaling sequences.

FIG. 18 is a block diagram illustrating an apparatus according to example embodiments. The apparatus may be a network entity 180 such as a network repository function (NRF) (entity) comprising a receiving circuitry 181, a deleting circuitry 182, and a transmitting circuitry 183. The receiving circuitry 181 receives, from a network entity, a network entity composition deregistration request including an identifier of a network entity composition to be deregistered. The deleting circuitry 182 deletes a profile for said network entity composition. The transmitting circuitry 183 transmits, towards said network entity, a network entity composition deregistration response indicative of a result of said network entity composition deregistration request. FIG. 29 is a schematic diagram of a procedure according to example embodiments. The apparatus according to FIG. 18 may perform the method of FIG. 29 but is not limited to this method. The method of FIG. 29 may be performed by the apparatus of FIG. 18 but is not limited to being performed by this apparatus.

As shown in FIG. 29, a procedure according to example embodiments comprises an operation of receiving (S291), from a network entity, a network entity composition deregistration request including an identifier of a network entity composition to be deregistered, an operation of deleting (S292) a profile for said network entity composition, and an operation of transmitting (S293), towards said network entity, a network entity composition deregistration response indicative of a result of said network entity composition deregistration request.

In an embodiment at least some of the functionalities of the apparatus shown in FIG. 18 may be shared between two physically separate devices forming one operational entity. Therefore, the apparatus may be seen to depict the operational entity comprising one or more physically separate devices for executing at least some of the described processes.

According to further example embodiments, said network entity is in said network entity composition.

Alternatively, according to further example embodiments, said network entity is an operation, administration, and maintenance entity.

Alternatively, or in addition, according to further example embodiments, said network entity composition deregistration request is a request to delete said network entity composition to be deregistered.

According to further example embodiments, said network entity composition is a network function set, and said profile for said network entity composition is a network function set profile.

Alternatively, according to further example embodiments, said network entity composition is a network function service set, and said profile for said network entity composition is a network function service set profile.

Alternatively, according to further example embodiments, said network entity composition is a network function group, and said profile for said network entity composition is a network function group profile.

In the following, example embodiments are explained in more specific terms.

According to example embodiments, an NF (service) profile does no longer need to contain attributes common to (its) NF (service) set.

Further, according to example embodiments, an NF (service) set profile is registered only once by an NF (service) set to the NRF.

Furthermore, according to example embodiments, an NF (service) set profile is discovered only once from the NRF. The NF discovery response can include NF profiles, NF set profiles and/or NF service set profiles.

Still further, according to example embodiments, a change of an attribute of an NF (service) set requires only one NF registration update from the NF (service) set and results in only one NF status change notification towards NFs subscribed to receive notifications about changes of NF profiles of producers within an NF set.

Moreover, according to example embodiments, NF implementations that may not support the NF set concept yet and that are part of a group (e.g. UDM, UDR, AUSF, PCF, CHF) may support the same enhancements but store common parameters of a group (rather than of a set) to achieve the same kind of optimization as described above for the NF set profile concept.

In addition, according to example embodiments, backward compatibility with NF service consumers not supporting NF set profiles is provided.

Finally, according to example embodiments, an NF service sets can be defined as part of NF set profiles and/or of NF instance profiles.

These example embodiments are explained below in more detail.

Namely, according to example embodiments, the NFManagement API (application programming interface) is extended to support new resources enabling to register new NF (service) set profiles.

Thus, according to example embodiments, to provide for enhanced NF management procedures as explained further down below, new resources are added.

Figure 33:
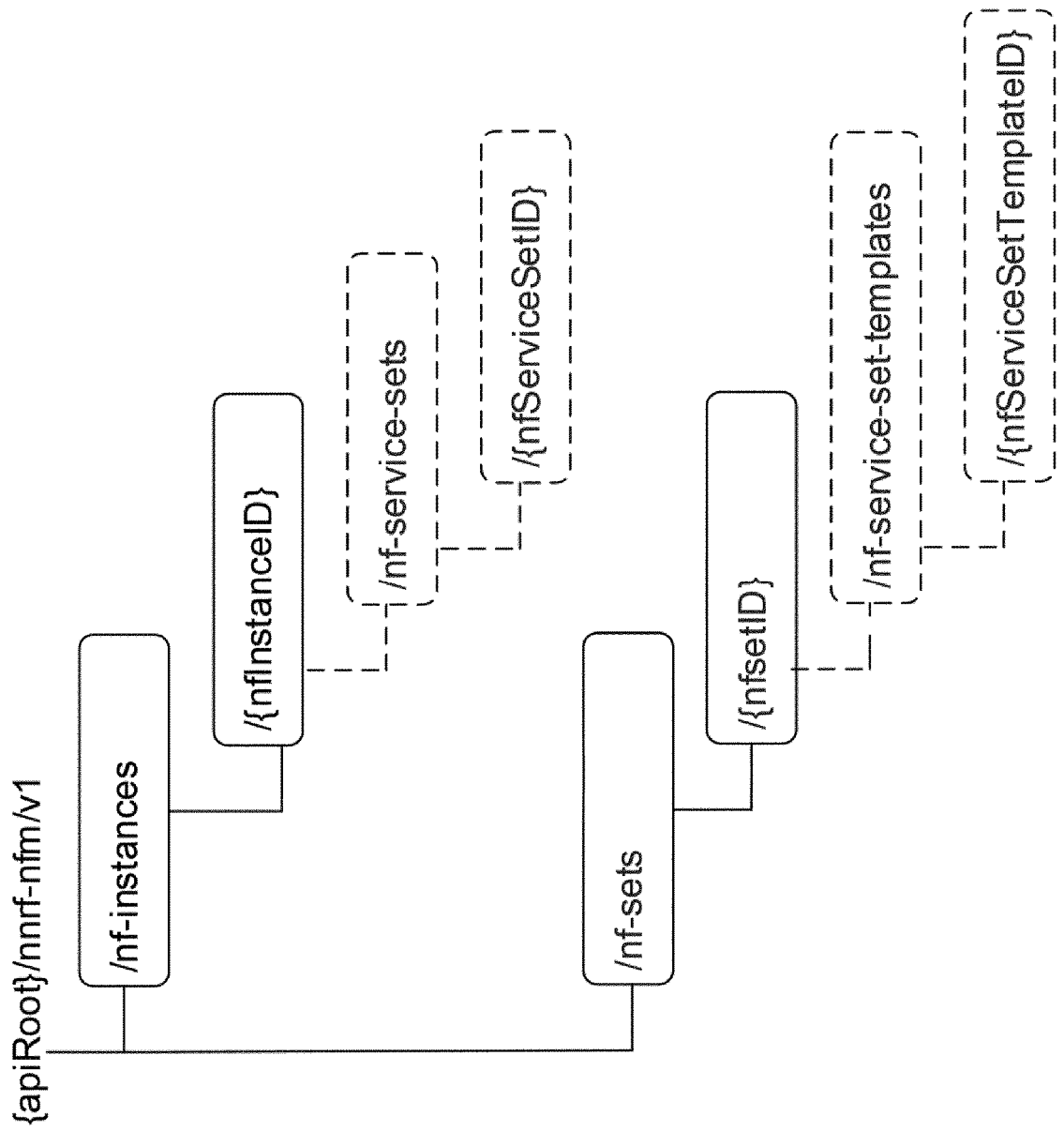
FIG. 33 is a schematic diagram illustrating a resource structure according to example embodiments.

FIG. 33 is a schematic diagram illustrating a resource structure according to example embodiments.

According to the example embodiments, the entry "/nf-service-sets" is added to the resource structure, and the sub-entry "/{nfServiceSetID}" is added to the entry "/nf-service-sets" in the resource structure.

Further, according to the example embodiments, the entry "/nf-sets" is added to the resource structure, the sub-entry "/{nfsetID}" is added to the entry "/nf-sets" in the resource structure, the sub-entry "/nf-service-set-templates" is added to the sub-entry "/{nfsetID}" in the resource structure, and the sub-entry "/{nfServiceSetTemplateID}" is added to the sub-entry "/nf-service-set-templates" in the resource structure.

Here, it is noted that the names of the entries and sub-entries added to the resource structure as explained above are not limiting and may be modified without deviating from the present disclosure.

The enhanced NF management procedures according to example embodiments utilizing the new resources are as follows.

While these enhanced NF management procedures according to example embodiments utilizing the new resources are described with reference to NF sets, these are likewise also applicable for NF service sets. That is, instead of every NF service instance registering attributes that are common to the NF service set to which it pertains, an NF instance may register only once an NF service set profile. In this case, when registering an NF service instance of the NF service set, the NF service instance profile only contains the attributes that are specific to the NF service instance and the NF service set ID. The same principle holds true for NF set profile update and NF status notification, NF discovery, and NF deregistration as discussed below.

NF Instance Registration, Including a New NF Set Profile Registration

Figure 34:
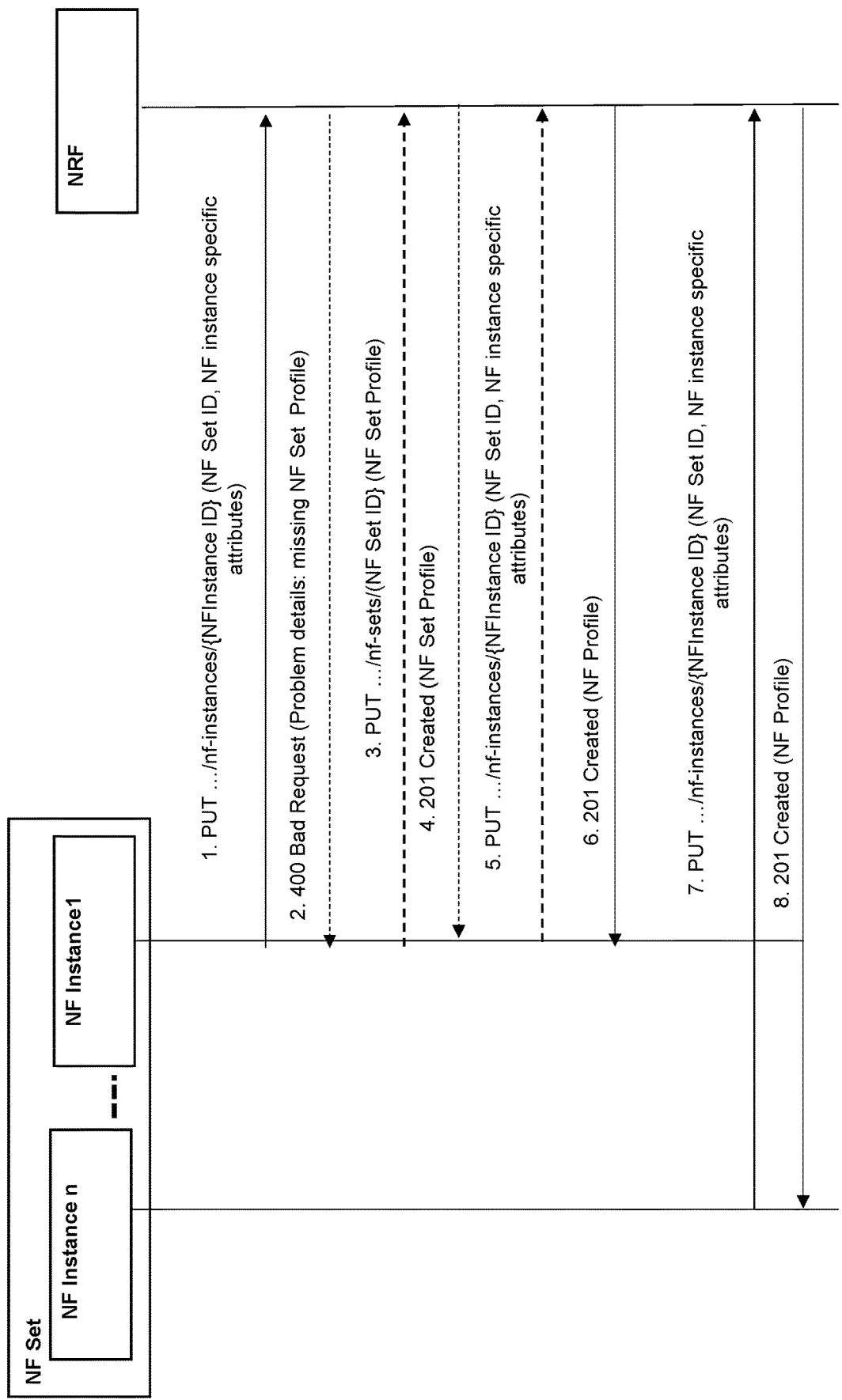
FIG. 34 shows a schematic diagram of signaling sequences according to example embodiments.

FIG. 34 shows a schematic diagram of signaling sequences according to example embodiments, and in particular illustrates an approach to avoid multiple registrations of the same NF set profile by different NF instances.

The procedure illustrated in FIG. 34 allows NF instance(s) of a particular NF set to register its NF profile in the NRF. The procedure includes the registration of the general parameters of the NF Instance, together with the list of services exposed by the NF instance.

According to example embodiments, the registration of a NF set profile, which is a one time registration by an OAM or by an NF instance of the NF set, i.e., on behalf of entire set members, and the registration of NF instance specific attributes by each of the NF instances, is introduced.

According to these example embodiments, it is ensured that there is only a single (i.e., one time) registration of the same NF set profile and not as many times as there are NF instances in the NF set.

In step 1 of FIG. 34, according to example embodiments, an NF instance of a particular NF set sends a hypertext transfer protocol (HTTP) PUT request to register the NF instance profile at the NRF by creating a resource with a uniform resource identifier (URI) representing the NF instance ID. The variable nfInstanceID represents the identifier of the registering NF instance. The registering NF instance registers only its NF set ID and NF instance specific attributes, and not the entire NF set profile.

In step 2 of FIG. 34, according to example embodiments, on receipt of the PUT request, the NRF determines that there is no corresponding NF set profile already registered for the NF set ID in the NRF. Based on such finding, the NRF replies with an error message "400 Bad Request (Problem details: missing NF Set Profile)".

If, on the other hand, on receipt of the PUT request in step 1 of FIG. 34 the NRF determines that there is already a registered NF set profile for the NF set ID of the registering NF instance, e.g., in case another NF instance belonging to the same NF set already registered to the NRF, i.e., as per the steps explained in 3 and 4, the reply with the error message and also steps 3, 4 and 5 of FIG. 34 are skipped.

In step 3 of FIG. 34, according to example embodiments, in case the NF instance receives the error message in step 2 of FIG. 34 with details "missing NF Set Profile", the NF instance sends a PUT request to the NRF to register the NF set profile by creating a resource representing the NF set profile with a URI identifying the NF set ID, e.g., . . . /nf-sets/{NF Set ID} (NF Set Profile). According to example embodiments, this will be the case if this is the first NF instance in this NF set registering to the NRF.

In step 4 of FIG. 34, according to example embodiments, on success, the NRF replies with "201 Created". The payload body of this PUT response contains the representation of the created resource (NF set profile), and the "Location" header contains the URI of the created resource.

In step 5 of FIG. 34, according to example embodiments, the NF instance of the particular NF set sends (re-transmits) the PUT request to register the NF instance profile at the NRF by creating a resource with the uniform resource identifier (URI) representing the NF instance ID. The variable nfInstanceID represents the identifier of the registering NF instance. The registering NF instance registers only its NF set ID and NF instance specific attributes, and not the entire NF set profile.

In step 6 of FIG. 34, according to example embodiments, on success, the NRF replies with "201 Created". The payload body of the PUT response contains the representation of the created resource (NF profile), and the "Location" header contains the URI of the created resource.

In step 7 of FIG. 34, according to example embodiments, other NF instance(s) of the particular NF set send(s) (a) PUT request(s) to register its NF instance, similar to step 1 (5) of FIG. 34.

In step 8 of FIG. 34, according to example embodiments, on success, in response to the above step 7 of FIG. 34, the NF instance(s) of the particular NF set receive(s) NRF replies with "201 Created".

NF Set Profile Update and NF Status Notification

Figure 35:
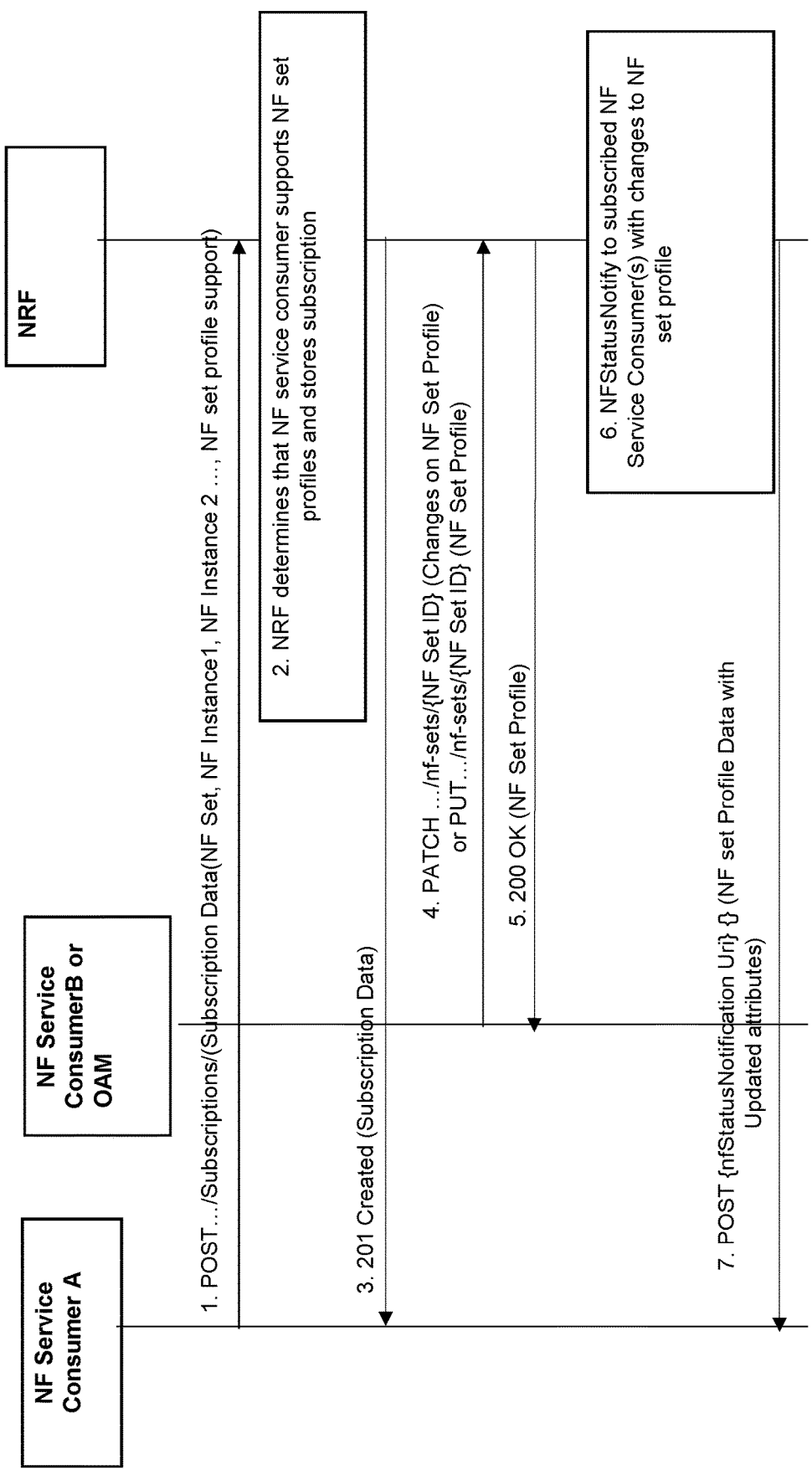
FIG. 35 shows a schematic diagram of signaling sequences according to example embodiments.

FIG. 35 shows a schematic diagram of signaling sequences according to example embodiments, and in particular illustrates an NF set profile update to an NRF and a resulting notification to an NF consumer supporting NF set profiles.

More particularly, FIG. 35 describes the procedure to update the NF set profile of NF instances already registered in the NRF. This is done by providing the updated NF set profile to the NRF. The update operation may apply to the whole NF set profile, i.e., may include a complete replacement of the existing profile by a new profile, or it may apply only to a subset of the parameters of the NF set profile, i.e., may include adding/deleting/replacing attributes of the registered NF set profile.

The procedure in FIG. 35 according to example embodiments also enables the NRF to notify subscribed NF consumers supporting NF set profiles of changes done to an NF set profile.

According to example embodiments, for changes affecting the entire NF set, only a single (NF set) profile update is required. A change of an NF set attribute results in a single notification with changes to a single NF set profile instead of one or several notifications (depending on subscription) with as many changes to NF instance profiles as there are NFs in the NF set.

In step 1 of FIG. 35, according to example embodiments, an NF service consumer subscribes by sending a, HTTP POST request to the resource URI representing the "subscriptions" collection resource, with subscription data identifying the NF status changes to be notified, e.g., identifying the need to notify NF status changes affecting the NF service producers of a given NF set. The POST request includes a new indication that the subscribing NF supports the concept of NF set profile.

In step 2 of FIG. 35, according to example embodiments, on receipt of the request with the NF set profile support indication in step 1 of FIG. 35, the NRF determines that the NF service consumer supports NF set profiles and stores the subscription (including the indication that the subscribing NF supports NF set profiles).

In step 3 of FIG. 35, according to example embodiments, on success, "201 Created" is returned to the NF consumer.

In step 4 of FIG. 35, according to example embodiments, either OAM or another NF service consumer performs an update of the NF set profile by sending an HTTP PUT or PATCH request to the resource URI representing the NF set profile. It provides the changes corresponding to the NF set profile.

In step 5 of FIG. 35, according to example embodiments, on success, "200 OK" is returned, where the payload body contains the NF set profile.

In step 6 of FIG. 35, according to example embodiments, the NRF determines that it needs to send NFStatusNotify to the subscribed NF service consumer(s), i.e., those subscribed in step 1 of FIG. 35.

In step 7 of FIG. 35, according to example embodiments, the NRF sends NFStatusNotify to the subscribed NF service consumer(s) (subscribed in step 1 of FIG. 35) with changes to the NF set profile data with update attributes.

Figure 36:
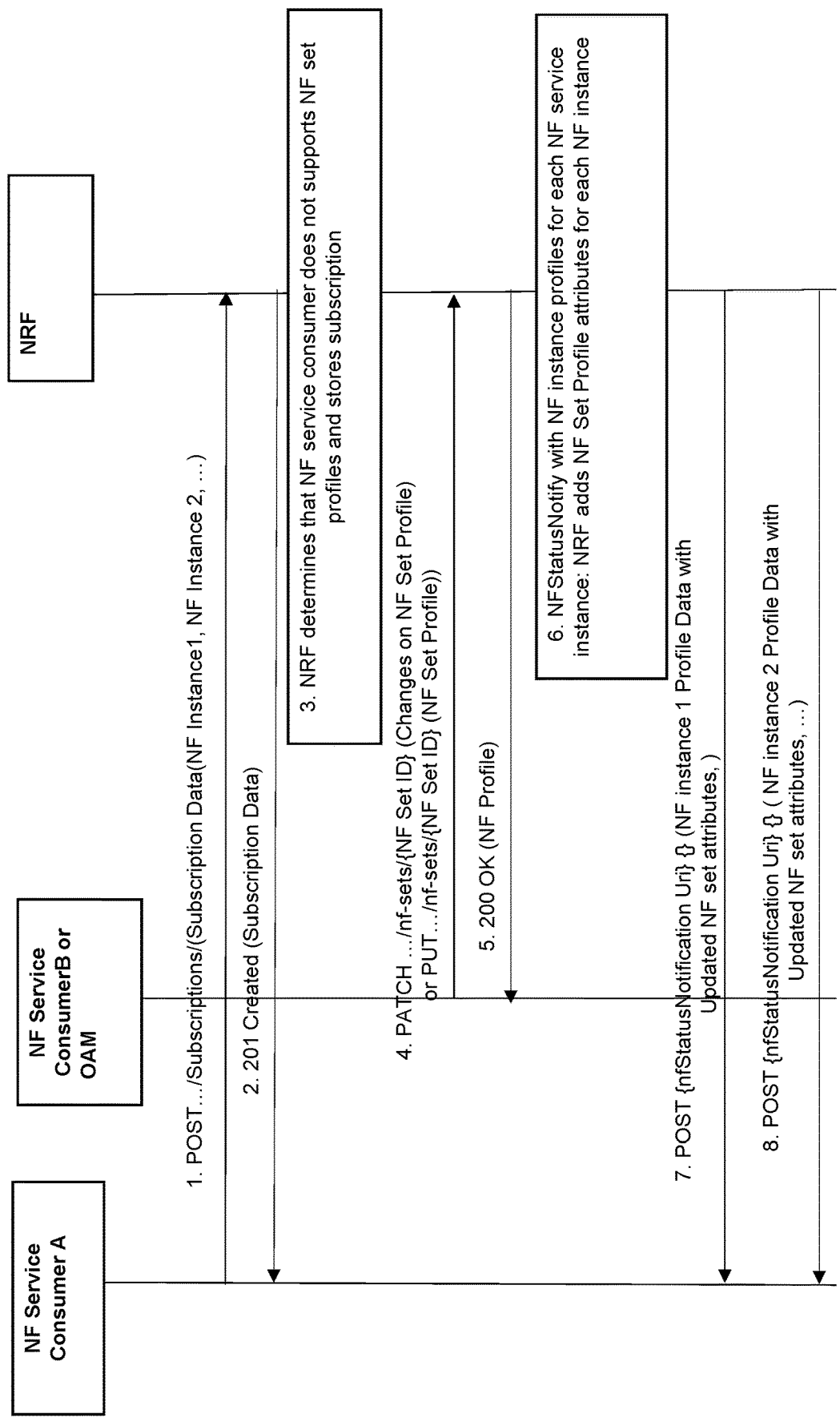
FIG. 36 shows a schematic diagram of signaling sequences according to example embodiments.

FIG. 36 shows a schematic diagram of signaling sequences according to example embodiments, and in particular illustrates an NF set profile update to an NRF and a resulting notification to an NF consumer not supporting NF set profiles (providing backward compatibility).

FIG. 36 illustrates a procedure to update the NF profile of NF instances which have already been registered in the NRF. Unlike the procedure illustrated in FIG. 35, this procedure is to support backward compatibility, i.e., in cases where the subscribing NF instance(s) do(es) not support the enhancement of NF profile set registration explained above.

Thus in step 1 of FIG. 36, the NF service consumer does not provide the "NF Set Support" indication (the new indication that the subscribing NF supports the concept of NF set profile), thus, the POST request indicates to the NRF that the NF service consumer does not supports NF set profiles.

In step 3 of FIG. 36, according to example embodiments, the NRF determines that the NF service consumer does not support NF set profiles and stores the subscription (including this finding).

In step 4 of FIG. 36, according to example embodiments, either OAM or another NF service consumer performs an update of the NF set profile by sending an HTTP PUT or PATCH request to the resource URI representing the NF set profile. It provides the changes corresponding to the NF set profile.

In step 5 of FIG. 36, according to example embodiments, on success, "200 OK" is returned, where the payload body contains the NF set profile.

In step 6 of FIG. 36, according to example embodiments, the NRF determines that it needs to send NFStatusNotify to the subscribed NF service consumer(s), i.e., those subscribed in step 1 of FIG. 36. In view of that in step 3 of FIG. 36 the NRF has determined that the NF service consumer (NF service consumer A) does not support NF set profiles, the NRF determines that it needs to send NFStatusNotify to this NF service consumer with NF instance profiles for each service instance; Thus, the NRF adds the NRF set profile attributes for each NF instance (of the updated NF set).

In steps 7 and 8 of FIG. 36, according to example embodiments, the NRF sends NFStatusNotify to the subscribed NF service consumer(s) (subscribed in step 1 of FIG. 36) with NF instance profiles for each service instance with update attributes.

That is, according to example embodiments, as a result, when an NF service consumer B or OAM updates its NF profile set data, the NRF notifies the changes to the subscribing NF service consumer A by signaling the NF set profile attribute (of NF service instance B) as attributes within the NF profile of NF instance B (and not as NF set profile data).

NF Discovery

Figure 37:
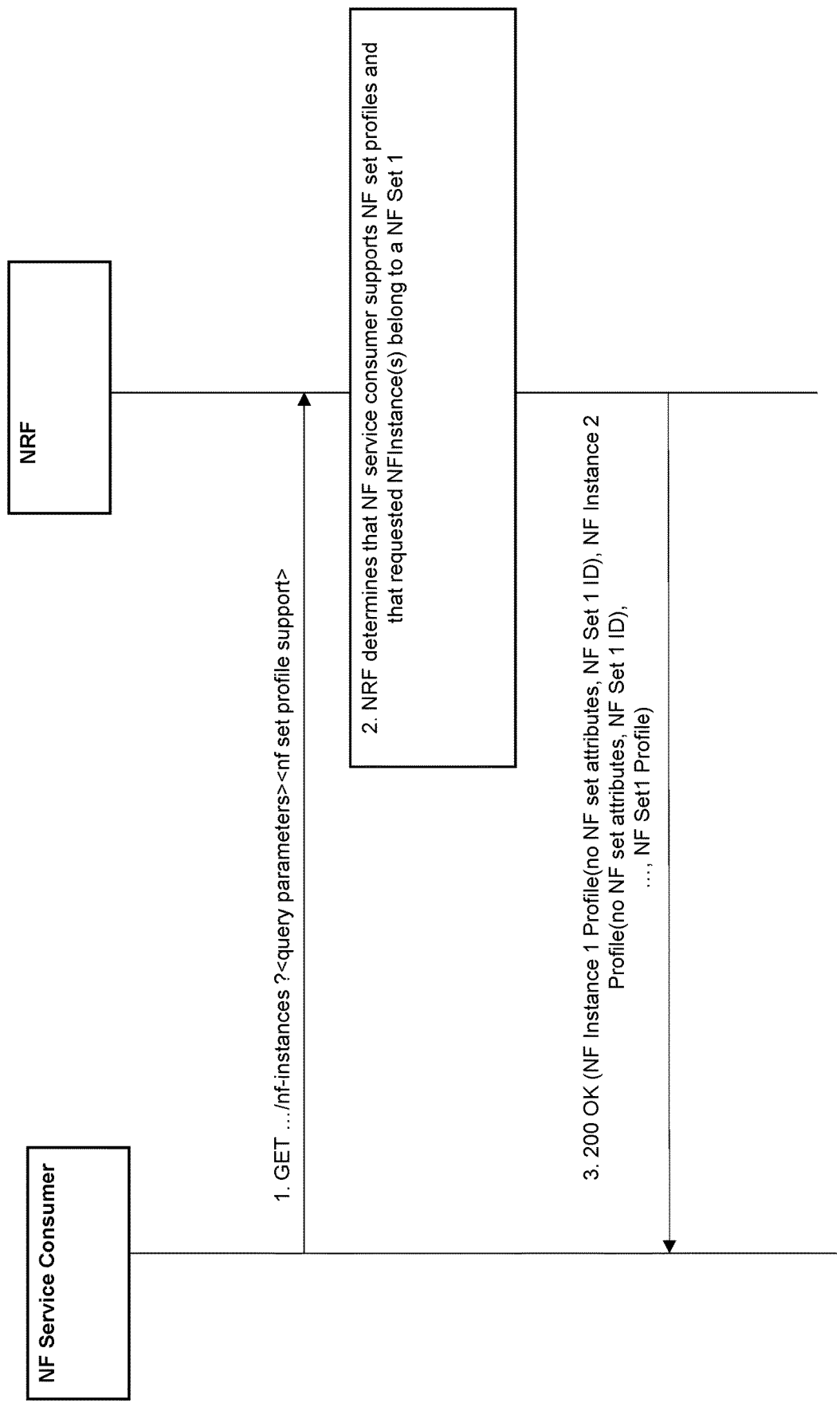
FIG. 37 shows a schematic diagram of signaling sequences according to example embodiments.

FIG. 37 shows a schematic diagram of signaling sequences according to example embodiments, and in particular illustrates an NF discovery request procedure by an NF service consumer supporting NF sets.

According to the NF discovery procedure of example embodiments as illustrated in FIG. 37, a set of NF instances (and their associated NF service instances), represented by their NF profile, that are currently registered in an NRF and that satisfy a number of input query parameters (discovery request), is discovered. According to these example embodiments, the NF service consumer indicates "NF Set Profile support" in the discovery request (the GET request includes a new indication that the discovery NF supports the concept of NF set profile) in order for the NRF to provide an optimal/efficient response, including sending a one time NF set profile.

In step 1 of FIG. 37, according to example embodiments, the NF service consumer sends a GET request to the resource URI "nf-instances" collection resource. The input filter criteria for the discovery request are included in query parameters. The NF service consumer provides the "NF Set Profile Support" indicator indicating to the NRF that it supports the NF set profiles concept.

In step 2 of FIG. 37, according to example embodiments, based on the received indication of "NF Set Profile Support", the NRF determines that the NF service consumer supports NF set profiles and that requested NFInstance(s) belong to a particular NF set, e.g., "NF Set 1".

In step 3 of FIG. 37, according to example embodiments, on success, "200 OK" is returned. In this response, the NRF includes an array of NF Profile objects, that satisfy the search filter criteria, e.g., all NF instances offering a certain NF service name, and additionally includes the NF set profile data. NRF does not provide NF set profile attributes in each of the NF instance profiles but instead the NRF indicates the NF set ID in each NF instance profile.

Figure 38:
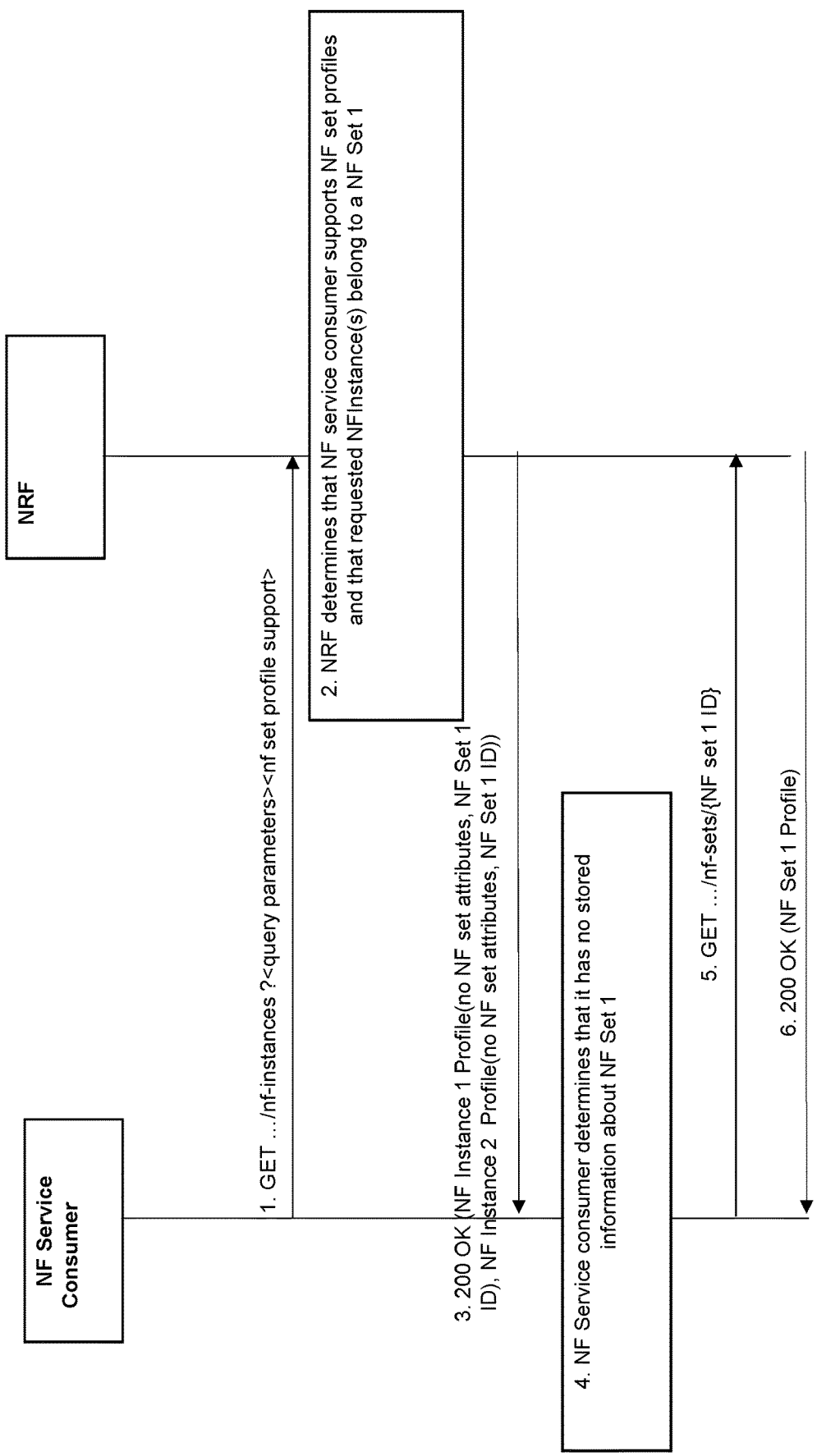
FIG. 38 shows a schematic diagram of signaling sequences according to example embodiments.

FIG. 38 shows a schematic diagram of signaling sequences according to example embodiments, and in particular illustrates another NF discovery request procedure by an NF service consumer supporting NF sets.

According to the NF discovery procedure of example embodiments as illustrated in FIG. 38, a set of NF instances (and their associated NF service instances), represented by their NF profile, that are currently registered in the NRF and that satisfy a number of input query parameters (discovery request), is discovered. According to these example embodiments, similar to the example embodiments explained with reference to FIG. 37, the NF service consumer indicates "NF Set Profile support" in the discovery request in order for the NRF to provide an optimal/efficient response.

However, according to the example embodiments as illustrated in FIG. 38, the NRF does not return the NF set profile data in the NF discovery response. If the NF consumer (receiving the NF discovery response without the NF set profile data) does not already have the NF set profile corresponding to the NF set ID indicated in the returned NF profiles, the NF service consumer separately requests to get the NF set profile (data) from the NRF.

In step 1 of FIG. 38, according to example embodiments, the NF service consumer sends a GET request to the resource URI "nf-instances" collection resource. The input filter criteria for the discovery request is included in the query parameters. The NF service consumer provides the "NF Set Profile Support" indicator indicating to the NRF that it supports the NF set profile concept.

In step 2 of FIG. 38, according to example embodiments, based on the received indication of "NF Set Profile Support", the NRF determines that the NF service consumer supports NF set profiles and that the requested NFInstance(s) belong to a particular NF set, e.g., "NF Set 1".

In step 3 of FIG. 38, according to example embodiments, on success, "200 OK" is returned. In this response, the NRF includes an array of NF profile objects that satisfy the search filter criteria, e.g., all NF instances offering a certain NF service name. The NRF does not provide NF set profile attributes in each of the NF instance profiles but instead indicates the NF set ID in each NF instance profile (NRF does not return/include an NF set profile).

In step 4 of FIG. 38, according to example embodiments, on receipt of NRF response in step 3 of FIG. 38, the NF service consumer determines that it does not already have stored any information on the NF set profile corresponding to the NF Set 1 ID.

In step 5 of FIG. 38, according to example embodiments, thus, the NF service consumer sends a request to get the NF set profile corresponding to the NF Set 1 ID.

In step 6 of FIG. 38, according to example embodiments, on success, "200 OK" is returned, along with the NF Set 1 profile.

Figure 39:
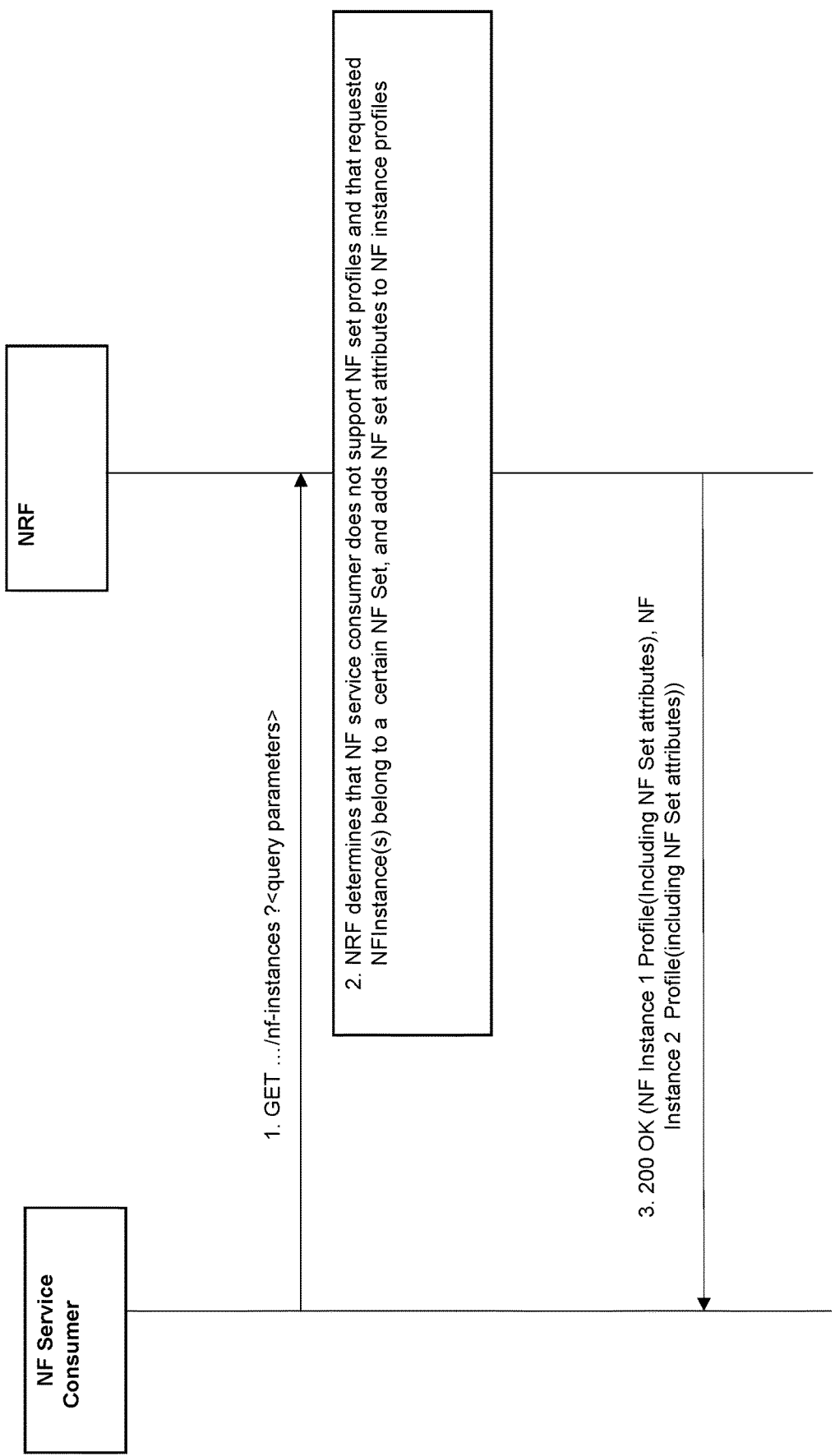
FIG. 39 shows a schematic diagram of signaling sequences according to example embodiments.

FIG. 39 shows a schematic diagram of signaling sequences according to example embodiments, and in particular illustrates an NF discovery request procedure by an NF service consumer not supporting NF set profiles to provide/ensure backward compatibility (i.e. for those NF consumers that do not support NF Set profile).

In step 1 of FIG. 39, according to example embodiments, the NF service consumer sends a GET request to the resource URI "nf-instances" collection resource. The input filter criteria for the discovery request is included in query parameters. Since this NF instance does not support NF set profile, so it does not provide the "NF Set Profile Support" parameter/indication and thus indicates to the NRF a lack of support of NF set profile (the NF set profile concept).

In step 2 of FIG. 39, according to example embodiments, the NRF determines that the NF service consumer does not support NF set profiles and that the requested NFInstance(s) belong to a certain NF set, and adds NF set attributes to NF instance profiles.

In step 3 of FIG. 39, according to example embodiments, on success, "200 OK" is returned. In this response, the NRF includes NF set attributes within each returned NF instance profile.

NF Deregistration

Figure 40:
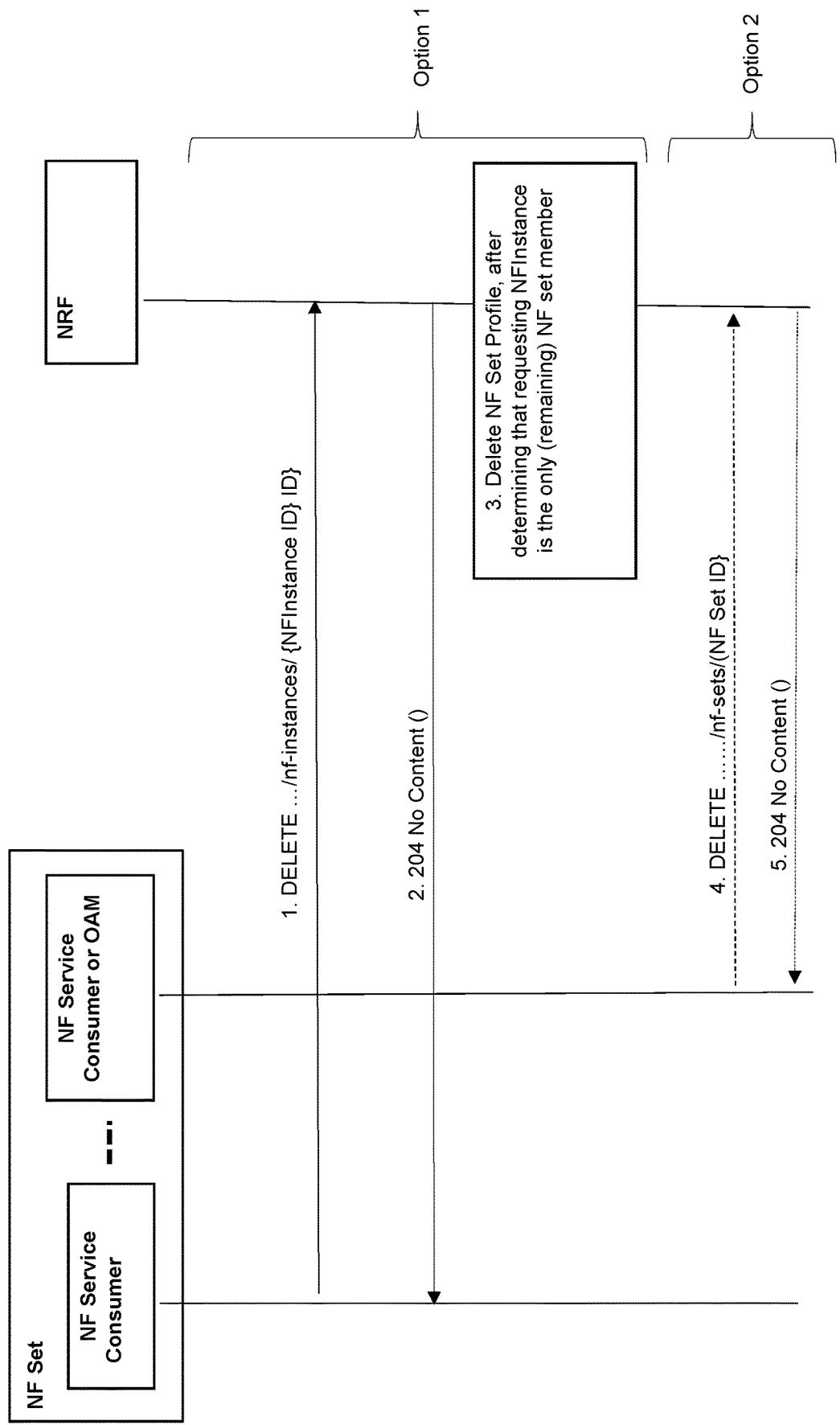
FIG. 40 shows a schematic diagram of signaling sequences according to example embodiments.

FIG. 40 shows a schematic diagram of signaling sequences according to example embodiments, and in particular illustrates an NF instance deregistration (processing) of (for) an earlier registered instance within an NF set.

The NF deregistration procedure of example embodiments as illustrated in FIG. 40 is to remove an NF set profile and a profile of a network function previously registered in the NRF. The NF deregistration procedure of example embodiments as illustrated in FIG. 40 is executed by deleting a given resource identified by an "NF Instance ID".

A first option is illustrated in steps 1 to 3 of FIG. 40. A second option is illustrated in steps 4 and 5 of FIG. 40. Accordingly, steps 4 and 5 of FIG. 40 are not to be seen as mandatorily following steps 1 to 3 of FIG. 40.

In step 1 of FIG. 40, according to example embodiments, the NF instance belonging to the NF set sends an HTTP DELETE request to the resource URI representing the NF instance. In the request, the NF instance provides an NF Instance ID. According to example embodiments, the request body is empty.

In step 2 of FIG. 40, according to example embodiments, on success, "204 No Content" is returned. According to example embodiments, the response body is empty In step 3 of FIG. 40, according to example embodiments, if the NRF determines that the requesting NF instance in step 1 of FIG. 40 is the only (remaining) NF set member, then the NRF deletes the corresponding NF set profile.

In step 4 of FIG. 40, according to example embodiments, the last member of the NF set or an OAM sends an HTTP DELETE request to the NRF by providing the NF set ID, such that the last member of the NF set or the OAM thus requests to delete the NF set profile.

In step 5 of FIG. 40, according to example embodiments, on success, "204 No Content" is returned. According to example embodiments, the response body is empty.

Group Profile Concept e.g. Specific to Certain 5GC NFs such as UDM, AUSF, UDR, PCF, CHF or any Future NF Support Group As already mentioned above, while exemplary embodiments are described with reference to sets and in particular to set profiles (NF sets (NF set profiles), NF service sets (NF service set profiles)), the explained principles are likewise applicable to 5GC NFs such as UDM, AUSF, UDR, PCF, CHF, etc., c which implement a group concept (but do not implement an NF set concept). For example, in the case of 5GC NFs such as UDM, AUSF, UDR, PCF, CHF, etc., which implement the group concept, an NF group profile is also registered in NRF separately to achieve a similar kind of optimization as explained above in relation to NF set profiles. As such, sets and groups are subsumed herein as compositions (e.g. network entity composition).

To summarize the above, according to example embodiments, an NF (service) profile does no longer need to contain attributes common to an NF (service) set.

Further, according to example embodiments, an NF (service) set profile is registered only once by an NF (service) set to an NRF.

Further, according to example embodiments, an NF (service) set profile is discovered only once from an NRF. An NF discovery response can include NF profiles, NF set profiles and/or NF service set profiles.

Further, according to example embodiments, a change of an attribute of an NF (service) set requires only one NF registration update from the NF (service) set and results in only one NF status change notification.

Further, according to example embodiments, NF (service) instance profiles may contain the same attributes as NF (service) set profiles with different values. If an NF (service) instance profile contains such an attribute, the value of that attribute is applicable instead of the value of that attribute within the NF (service) set profiles. This allows to define a default value for an NF set that can be changed for some NF instances within the set.

Further, according to example embodiments, during registration of an NF instance, an NRF determines if it already stores the NF profile of the NF instance belonging to the NF-Set. According to example embodiments, new "problem details" in an error response message indicating that the NF set profile is not available are specified. According to example embodiments, when receiving these problem details, an NF instance then needs to register the NF set before registering itself. This approach according to example embodiments avoids sending an entire profile by subsequent NF instances in the course of registration and also in update procedures.

Further, according to example embodiments, backward compatibility with NF service consumers not supporting NF set profiles is provided. According to example embodiments, during subscription to notifications about NF profile changes and during NF discovery request, an NF service consumer supporting NF set profiles indicates that. According to example embodiments, if an NF service consumer subscribed to notifications about NF instance changes and did not indicate that it supports NF set profiles, and attributes within the NF set profile are changed, the NF service consumer obtains a notification about a change of the corresponding attribute within the NF instance profile. According to example embodiments, if an NF service consumer request the discovery of NF instances or NF services and does not indicate that it supports NF set profiles within that request, it obtains NF instance profiles also containing all attributes from the corresponding NF set profile.

Further, according to example embodiments, NF service sets can be defined as part of NF set profiles and/or of NF instance profiles. According to example embodiments, NF service sets as part of NF set profiles have the advantage that they do not need to be stored separately per NF instance. However, as the NF service set ID is only unique within an NF instance, a new NF service set template ID which is unique per NF set profile is required, and provided according to example embodiments. NF service instance profiles contain both the NF service set ID and the new NF service set template ID.

Further, according to example embodiments, disclosed principles in relation to the NF set concept are extended to also enable similar behavior in case of other NFs using a group concept, i.e., applicable to 5GC NFs such as UDM, UDR, PCF, CHF.

According to example embodiments, the amount of signaling necessary for the above outlined procedures is reduced. Namely, smaller messages for NF instance registration are enabled, smaller response messages from the NRF for the NF discovery service (which become very large if multiple NF service instance profiles are returned without application of above-explained example embodiments) are enabled, a smaller number of notifications about changes in NF instance profiles is enabled, and for changes affecting the entire NF set, only a single profile update is required.

Further, according to example embodiments, the amount of stored data in the NRF and in NF consumers is reduced Furthermore, according to example embodiments, the amount of configured data required in NF instances for the registration of NF service instances (if NF set profiles are preconfigured in an NRF) is reduced.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 41:
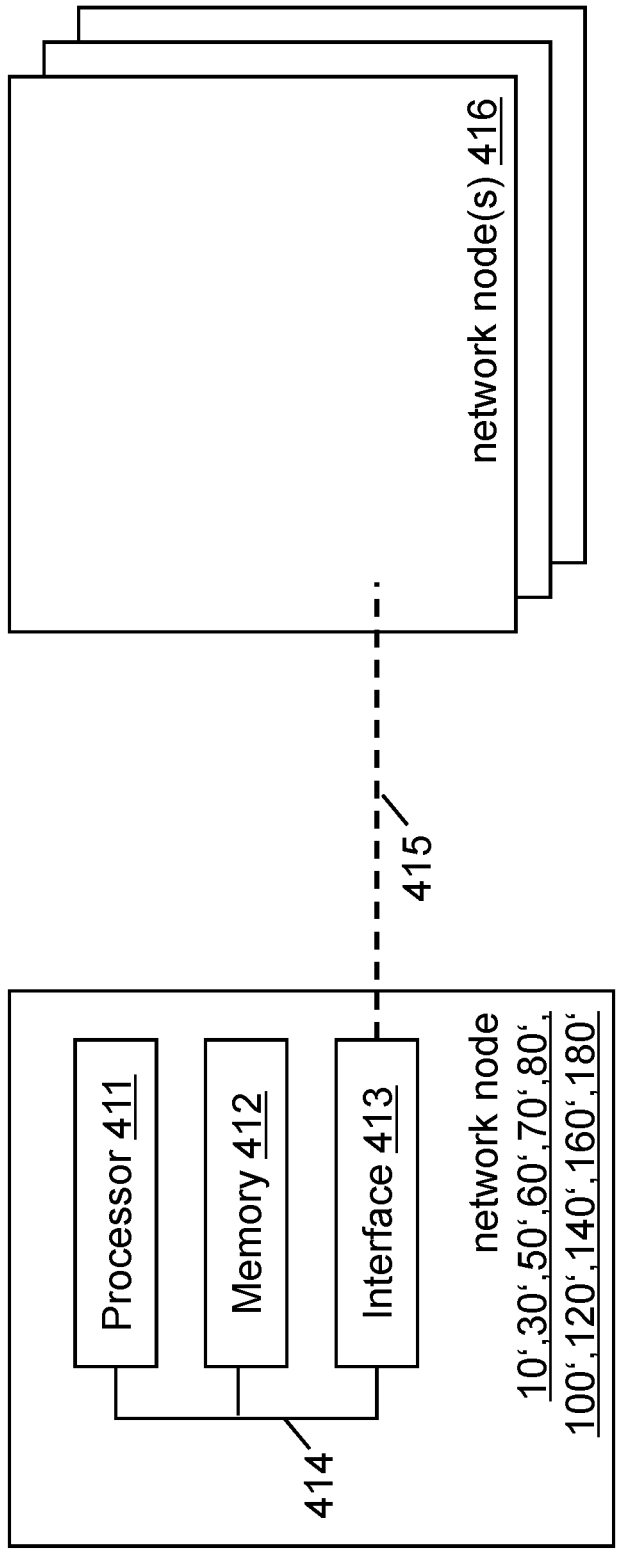
FIG. 41 is a block diagram alternatively illustrating apparatuses according to example embodiments.

In FIG. 41, an alternative illustration of apparatuses according to example embodiments is depicted. As indicated in FIG. 41, according to example embodiments, the apparatus (network node) 10' (corresponding to the network entity 10) comprises a processor 411, a memory 412 and an interface 413, which are connected by a bus 414 or the like. Further, as indicated in FIG. 41, according to example embodiments, the apparatus (network node) 30' (corresponding to the network repository function entity 30) comprises a processor 411, a memory 412 and an interface 413, which are connected by a bus 414 or the like. Further, as indicated in FIG. 41, according to example embodiments, the apparatus (network node) 50' (corresponding to the network entity 50) comprises a processor 411, a memory 412 and an interface 413, which are connected by a bus 414 or the like. Further, as indicated in FIG. 41, according to example embodiments, the apparatus (network node) 60' (corresponding to the network repository function entity 50) comprises a processor 411, a memory 412 and an interface 413, which are connected by a bus 414 or the like. Further, as indicated in FIG. 41, according to example embodiments, the apparatus (network node) 70' (corresponding to the network entity 70) comprises a processor 411, a memory 412 and an interface 413, which are connected by a bus 414 or the like. Further, as indicated in FIG. 41, according to example embodiments, the apparatus (network node) 80' (corresponding to the network repository function entity 80) comprises a processor 411, a memory 412 and an interface 413, which are connected by a bus 414 or the like. Further, as indicated in FIG. 41, according to example embodiments, the apparatus (network node) 100' (corresponding to the network entity 100) comprises a processor 411, a memory 412 and an interface 413, which are connected by a bus 414 or the like. Further, as indicated in FIG. 41, according to example embodiments, the apparatus (network node) 120' (corresponding to the network repository function entity 120) comprises a processor 411, a memory 412 and an interface 413, which are connected by a bus 414 or the like. Further, as indicated in FIG. 41, according to example embodiments, the apparatus (network node) 140' (corresponding to the network entity 140) comprises a processor 411, a memory 412 and an interface 413, which are connected by a bus 414 or the like. Further, as indicated in FIG. 41, according to example embodiments, the apparatus (network node) 160' (corresponding to the network repository function entity 160) comprises a processor 411, a memory 412 and an interface 413, which are connected by a bus 414 or the like. Further, as indicated in FIG. 41, according to example embodiments, the apparatus (network node) 180' (corresponding to the network repository function entity 180) comprises a processor 411, a memory 412 and an interface 413, which are connected by a bus 414 or the like. The apparatus (network node) 10',30',50',60',70',80',100', 120',140',160',180' (corresponding to the network entity 10 or the network repository function entity 30 or the network entity 50 or the network repository function entity 60 or the network entity 70 or the network repository function entity 80 or the network entity 100 or the network repository function entity 120 or the network entity 140 or the network repository function entity 160 or the network repository function entity 180) may be connected via link 415 to another apparatus(es) 416, which may in turn be an apparatus (network node) 10',30',50',60',70',80',100',120',140', 160',180' (corresponding to the network entity 10 or the network repository function entity 30 or the network entity 50 or the network repository function entity 60 or the network entity 70 or the network repository function entity 80 or the network entity 100 or the network repository function entity 120 or the network entity 140 or the network repository function entity 160 or the network repository function entity 180).

The processor 411 and/or the interface 413 may also include a modem or the like to facilitate communication over a (hardwire or wireless) link, respectively. The interface 413 may include a suitable transceiver coupled to one or more antennas or communication means for (hardwire or wireless) communications with the linked or connected device(s), respectively. The interface 413 is generally configured to communicate with at least one other apparatus, i.e. the interface thereof.

The memory 412 may store respective programs assumed to include program instructions or computer program code that, when executed by the respective processor, enables the respective electronic device or apparatus to operate in accordance with the example embodiments.

In general terms, the respective devices/apparatuses (and/ or parts thereof) may represent means for performing respective operations and/or exhibiting respective functionalities, and/or the respective devices (and/or parts thereof)

may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network node 10 comprises at least one processor 411, at least one memory 412 including computer program code, and at least one interface 413 configured for communication with at least another apparatus. The processor (i.e. the at least one processor 411, with the at least one memory 412 and the computer program code) is configured to perform transmitting, towards a network repository function, a network entity registration request including an identifier of said network entity, an identifier of said network entity composition, and network entity specific attributes of said network entity (thus the apparatus comprising corresponding means for transmitting), and to perform receiving a network entity registration response indicative of a result of said network entity registration request (thus the apparatus comprising corresponding means for receiving).

According to example embodiments, an apparatus representing the network node 30 comprises at least one processor 411, at least one memory 412 including computer program code, and at least one interface 413 configured for communication with at least another apparatus. The processor (i.e. the at least one processor 411, with the at least one memory 412 and the computer program code) is configured to perform receiving, from a network entity in a network entity composition, a network entity registration request including an identifier of said network entity, an identifier of said network entity composition, and network entity specific attributes of said network entity (thus the apparatus comprising corresponding means for receiving), and to perform transmitting, towards said network entity, a network entity registration response indicative of a result of said network entity registration request (thus the apparatus comprising corresponding means for transmitting).

According to example embodiments, an apparatus representing the network node 50 comprises at least one processor 411, at least one memory 412 including computer program code, and at least one interface 413 configured for communication with at least another apparatus. The processor (i.e. the at least one processor 411, with the at least one memory 412 and the computer program code) is configured to perform transmitting, towards a network repository function, a network entity composition profile update request including an identifier of a network entity composition and information on an update of a profile for said network entity composition (thus the apparatus comprising corresponding means for transmitting), and to perform receiving a network entity composition profile update response indicative of a result of said network entity registration request (thus the apparatus comprising corresponding means for receiving).

According to example embodiments, an apparatus representing the network node 60 comprises at least one processor 411, at least one memory 412 including computer program code, and at least one interface 413 configured for communication with at least another apparatus. The processor (i.e. the at least one processor 411, with the at least one memory 412 and the computer program code) is configured to perform receiving, from a network entity, a network entity composition profile update request including an identifier of a network entity composition and information on an update of a profile for said network entity composition (thus the apparatus comprising corresponding means for receiving), and to perform transmitting, towards said network entity, a network entity composition profile update response indicative of a result of said network entity registration request (thus the apparatus comprising corresponding means for transmitting).

According to example embodiments, an apparatus representing the network node 70 comprises at least one processor 411, at least one memory 412 including computer program code, and at least one interface 413 configured for communication with at least another apparatus. The processor (i.e. the at least one processor 411, with the at least one memory 412 and the computer program code) is configured to perform transmitting, towards a network repository function, a network entity subscription request (thus the apparatus comprising corresponding means for transmitting), and to perform receiving, from said network repository function, a network entity subscription response indicative of a result of said network entity subscription request (thus the apparatus comprising corresponding means for receiving).

According to example embodiments, an apparatus representing the network node 80 comprises at least one processor 411, at least one memory 412 including computer program code, and at least one interface 413 configured for communication with at least another apparatus. The processor (i.e. the at least one processor 411, with the at least one memory 412 and the computer program code) is configured to perform receiving, from a network entity, a network entity subscription request (thus the apparatus comprising corresponding means for receiving), and to perform transmitting, towards said network entity, a network entity subscription response indicative of a result of said network entity subscription request (thus the apparatus comprising corresponding means for transmitting).

According to example embodiments, an apparatus representing the network node 100 comprises at least one processor 411, at least one memory 412 including computer program code, and at least one interface 413 configured for communication with at least another apparatus. The processor (i.e. the at least one processor 411, with the at least one memory 412 and the computer program code) is configured to perform transmitting, towards a network repository function, a network entity discovery request including at least one match parameter (thus the apparatus comprising corresponding means for transmitting), and to perform receiving a network entity discovery response indicative of at least one network service providing entity profile of a network service providing entity in a network entity composition, said at least one network service providing entity profile satisfying said at least one match parameter (thus the apparatus comprising corresponding means for receiving).

According to example embodiments, an apparatus representing the network node 120 comprises at least one processor 411, at least one memory 412 including computer program code, and at least one interface 413 configured for communication with at least another apparatus. The processor (i.e. the at least one processor 411, with the at least one memory 412 and the computer program code) is configured to perform receiving, from a network entity, a network entity discovery request including at least one match parameter (thus the apparatus comprising corresponding means for receiving), to perform comparing registered network service providing entity profiles with said at least one match parameter (thus the apparatus comprising corresponding means for comparing), and to perform transmitting, towards said network entity, a network entity discovery response indicative of at least one network service providing entity profile of a network service providing entity in a network entity composition, said at least one network service providing entity profile satisfying said at least one match parameter (thus the apparatus comprising corresponding means for transmitting).

According to example embodiments, an apparatus representing the network node 140 comprises at least one processor 411, at least one memory 412 including computer program code, and at least one interface 413 configured for communication with at least another apparatus. The processor (i.e. the at least one processor 411, with the at least one memory 412 and the computer program code) is configured to perform transmitting, towards a network repository function, a network entity composition deregistration request including an identifier of a network entity composition to be deregistered (thus the apparatus comprising corresponding means for transmitting), and to perform receiving a network entity composition deregistration response indicative of a result of said network entity composition deregistration request (thus the apparatus comprising corresponding means for receiving).

According to example embodiments, an apparatus representing the network node 160 comprises at least one processor 411, at least one memory 412 including computer program code, and at least one interface 413 configured for communication with at least another apparatus. The processor (i.e. the at least one processor 411, with the at least one memory 412 and the computer program code) is configured to perform receiving, from a network entity, a network entity deregistration request including an identifier of said network entity (thus the apparatus comprising corresponding means for receiving), and to perform determining whether said network entity is a last member in a network entity composition (thus the apparatus comprising corresponding means for determining).

According to example embodiments, an apparatus representing the network node 180 comprises at least one processor 411, at least one memory 412 including computer program code, and at least one interface 413 configured for communication with at least another apparatus. The processor (i.e. the at least one processor 411, with the at least one memory 412 and the computer program code) is configured to perform receiving, from a network entity, a network entity composition deregistration request including an identifier of a network entity composition to be deregistered (thus the apparatus comprising corresponding means for receiving), to perform deleting a profile for said network entity composition (thus the apparatus comprising corresponding means for deleting), and to perform transmitting, towards said network entity, a network entity composition deregistration response indicative of a result of said network entity composition deregistration request (thus the apparatus comprising corresponding means for transmitting).

For further details regarding the operability/functionality of the individual apparatuses, reference is made to the above description in connection with any one of FIGS. 1 to 40, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for optimization of network function profile administration and discovery. Such measures exemplarily comprise, at a network entity in a network entity composition, transmitting, towards a network repository function, a network entity registration request including an identifier of said network entity, an identifier of said network entity composition, and network entity specific attributes of said network entity, and receiving a network entity registration response indicative of a result of said network entity registration request.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP Third Generation Partnership Project
5GC 5G core network
AUSF authentication server function
CHF charging function
CP control plane
eSBA enhanced Service Based Architecture
FQDN fully-qualified host name
HTTP hypertext transfer protocol
IP internet protocol
NF network functions
NRF network repository function
OAM operation, administration and maintenance
PCF policy control function
Rel-16 3GPP Release-16
SBA service based architecture
SBI service-based interfaces
UDM unified data management
UDR unified data repository
URI uniform resource identifier

The invention claimed is:

1. A method of a network repository function, the method comprising:
receiving, from a network entity, a network entity composition profile update request including an identifier of a network entity composition and information on an update of a profile for said network entity composition, wherein
said network entity composition is a network function set, said network entity is a network function instance or an operation, administration, and maintenance entity, and said profile for said network entity composition is a network function set profile, or
said network entity composition is a network function service set, said network entity is a network function instance or an operation, administration, and maintenance entity, and said profile for said network entity composition is a network function service set profile, or
said network entity composition is a network function group, said network entity is a network function instance or an operation, administration, and maintenance entity, and said profile for said network entity composition is a network function group profile, and
transmitting, towards said network entity, a network entity composition profile update response indicative of a result of said network entity composition profile update request, said network entity composition profile update response includes said profile updated for said network entity composition using a single network function set profile update for changes affecting the entire network function set, said network entity composition profile update results in a single notification with changes to the single network function set profile, and using the single network function set profile update for the changes affecting the entire network function set allows using smaller messages for network function instance profile updates, response messages from the network repository function for a network function discovery service, and number of notifications about changes in network function instance profiles, thereby reducing an amount of
stored data in the network repository function and in network function consumers,
configured data required in network function instances for the network function instance profile updates, and
signaling data required in completing network entity composition profile update procedure.

2. The method according to claim 1, wherein
said information on said update of said profile for said network entity composition comprises information on attributes to be added, deleted, and/or replaced in said profile for said network entity composition, or
said information on said update of said profile for said network entity composition comprises an updated profile for said network entity composition, and the method further comprises
updating said profile for said network entity composition based on said information on said update of said profile for said network entity composition.

3. An apparatus of a network repository function, the apparatus cornprising:
receiving circuitry configured to receive, from a network entity in a network entity composition, a network entity registration request including an identifier of said network entity, an identifier of said network entity composition, and network entity specific attributes of said network entity,
wherein
said network entity composition is a network function set, said network entity is a network function instance, a profile for said network entity is a network function profile, and said profile for said network entity composition is a network function set profile, or said network entity composition is a network function service set, said network entity is a network function instance, said profile for said network entity is a network function service profile, and said profile for said network entity composition is a network function service set profile, or said network entity composition is a network function group, said network entity is a network function instance, said profile for said network entity is a network function profile, and said profile for said network entity composition is a network function group profile, and transmitting circuitry configured to transmit, towards said network entity, a network entity registration response indicative of a result of said network entity registration request, said network entity registration response includes said profile registered for said network entity composition using a single network function set profile registration for the entire network function set, said network entity profile registration results in a single notification with registration of the single network function set profile, and using the single network function set profile registration for the entire network function set allows using smaller messages for network function instance registration, response messages from the network repository function for a network function discovery service, and number of notifications about changes in network function instance profiles, thereby reducing an amount of stored data in the network repository function and in network function consumers, configured data required in network function instances for the registration of network function service instances, and signaling data required in completing network entity registration procedure.

4. The apparatus according to claim 3, further comprising checking circuitry configured to check whether a profile for said network entity composition exists, and creating circuitry configured to create, if said profile for said network entity composition exists, said profile for said network entity based on said profile for said network entity composition and said network entity specific attributes of said network entity, wherein said network entity registration response indicates that said profile for said network entity is created, and optionally said network entity registration response includes said profile created for said network entity.

5. The apparatus according to claim 4, wherein said profile for said network entity is created such that a value of an attribute present in said profile for said network entity composition is overruled by a value of the same attribute present in said network entity specific attributes of said network entity.

6. The apparatus according to claim 3, further comprising checking circuitry configured to check whether a profile for said network entity composition exists, wherein if said profile for said network entity composition does not exist, said network entity registration response indicates that a profile for said network entity composition is missing.

7. The apparatus according to claim 3, further comprising receiving circuitry configured to receive, from said network entity, a composition profile registration request including said identifier of said network entity composition and said profile for said network entity composition.

8. The apparatus according to claim 7, further comprising transmitting circuitry configured to transmit, towards said network entity, a composition profile registration response indicating that said profile for said network entity composition is created, wherein said composition profile registration response optionally includes said profile created for said network entity composition.

9. The apparatus according to claim 8, further comprising receiving circuitry configured to receive, from said network entity, said network entity registration request including said identifier of said network entity, said identifier of said network entity composition, and said network entity specific attributes of said network entity.

10. An apparatus of a network entity, the apparatus comprising:

transmitting circuitry configured to transmit, towards a network repository function, a network entity composition profile update request including an identifier of a network entity composition and information on an update of a profile for said network entity composition, wherein said network entity composition is a network function set, said network entity is a network function instance or an operation, administration, and maintenance entity, and said profile for said network entity composition is a network function set profile, or said network entity composition is a network function service set, said network entity is a network function instance or an operation, administration, and maintenance entity, and said profile for said network entity composition is a network function service set profile, or said network entity composition is a network function group, said network entity is a network function instance or an operation, administration, and maintenance entity, and said profile for said network entity composition is a network function group profile, and receiving circuitry configured to receive a network entity composition profile update response indicative of a result of said network entity composition profile update request, said network entity composition profile update response includes said profile updated for said network entity composition using a single network function set profile update for changes affecting the entire network function set, said network entity composition profile update results in a single notification with changes to the single network function set profile, and using the single network function set profile update for the changes affecting the entire network function set allows using smaller messages for network function instance profile updates, response messages from the network repository function for a network function discovery service, and number of notifications about changes in network function instance profiles, thereby reducing an amount of stored data in the network repository function and in network function consumers, configured data required in network function instances for the network function instance profile updates, and signaling data required in completing network entity composition profile update procedure.

11. The apparatus according to claim 10, wherein
said information on said update of said profile for said network entity composition comprises information on attributes to be added, deleted, and/or replaced in said profile for said network entity composition, or
said information on said update of said profile for said network entity composition comprises an updated profile for said network entity composition.

12. An apparatus of a network repository function, the apparatus comprising:
receiving circuitry configured to receive, from a network entity, a network entity composition profile update request including an identifier of a network entity composition and information on an update of a profile for said network entity composition,
wherein
said network entity composition is a network function set, said network entity is a network function instance or an operation, administration, and maintenance entity, and said profile for said network entity composition is a network function set profile, or
said network entity composition is a network function service set, said network entity is a network function instance or an operation, administration, and maintenance entity, and said profile for said network entity composition is a network function service set profile, or
said network entity composition is a network function group, said network entity is a network function instance or an operation, administration, and maintenance entity, and said profile for said network entity composition is a network function group profile, and
transmitting circuitry configured to transmit, towards said network entity, a network entity composition profile update response indicative of a result of said network entity composition profile update request, said network entity composition profile update response includes said profile updated for said network entity composition using a single network function set profile update for changes affecting the entire network function set, said network entity registration composition profile update results in a single notification with changes to the single network function set profile, and using the single network function set profile update for the changes affecting the entire network function set allows using smaller messages for network function instance profile updates, response messages from the network repository function for a network function discovery service, and number of notifications about changes in network function instance profiles, thereby reducing an amount of
stored data in the network repository function and in network function consumers,
configured data required in network function instances for the network function instance profile updates, and
signaling data required in completing network entity composition profile update procedure.

13. The apparatus according to claim 12, wherein
said information on said update of said profile for said network entity composition comprises information on attributes to be added, deleted, and/or replaced in said profile for said network entity composition, or
said information on said update of said profile for said network entity composition comprises an updated profile for said network entity composition, and the apparatus further comprises
updating circuitry configured to update said profile for said network entity composition based on said information on said update of said profile for said network entity composition.

* * * * *